(12) United States Patent
Nozaki

(10) Patent No.: US 7,036,375 B2
(45) Date of Patent: May 2, 2006

(54) QCM SENSOR AND QCM SENSOR DEVICE

(75) Inventor: Takaaki Nozaki, Iruma (JP)

(73) Assignee: Citizen Watch Co., Ltd., Tokyo (JP)

( * ) Notice: Subject to any disclaimer, the term of this patent is extended or adjusted under 35 U.S.C. 154(b) by 0 days.

(21) Appl. No.: 10/811,394

(22) Filed: Mar. 29, 2004

(65) Prior Publication Data

US 2004/0187580 A1 Sep. 30, 2004

(30) Foreign Application Priority Data

Mar. 28, 2003 (JP) ............................. 2003-089620
Mar. 5, 2004 (JP) ............................. 2004-061668

(51) Int. Cl.
*G01H 1/00* (2006.01)
*G01H 13/00* (2006.01)
*G01N 29/00* (2006.01)

(52) U.S. Cl. .................. 73/579; 73/24.06; 73/64.53; 73/61.75; 73/61.79

(58) Field of Classification Search .............. 73/579, 73/590, 24.01, 24.03, 24.06, 64.53, 64.56, 73/64.41, 64.49, 64.75, 64.79, 61.41, 61.49, 73/61.75, 61.79
See application file for complete search history.

(56) References Cited

U.S. PATENT DOCUMENTS

| 4,818,959 | A | * | 4/1989 | Katoh ....................... 333/28 R |
| 6,111,512 | A | * | 8/2000 | Sugimoto et al. ........... 340/577 |
| 6,544,478 | B1 | * | 4/2003 | Oyama et al. ........... 422/82.01 |
| 6,819,203 | B1 | * | 11/2004 | Taniguchi .................. 333/193 |
| 2005/0016276 | A1 | * | 1/2005 | Guan et al. ................. 73/579 |

FOREIGN PATENT DOCUMENTS

JP 2000-338022 A 12/2000

OTHER PUBLICATIONS

Acoustic Wave Sensors by Academic Press, 1997 (ISBM 0-12-077460-7) pp. 918-929.
Bunseki Kagaku The Japan Society for Analytical Chemistry 1997, No. 12, vol. 46, p. 917-930.

* cited by examiner

*Primary Examiner*—Helen Kwok
(74) *Attorney, Agent, or Firm*—Sughrue Mion, PLLC

(57) ABSTRACT

A plurality of quartz crystal resonators having different resonance frequencies are connected in parallel. A combined admittance of the resonators is measured. Equivalent circuit constants of all the resonators are obtained by a method of least squares from admittance characteristics. A change in the resonance frequency is measured and mass of a substance adsorbed to a piezoelectric transducer is calculated.

27 Claims, 21 Drawing Sheets

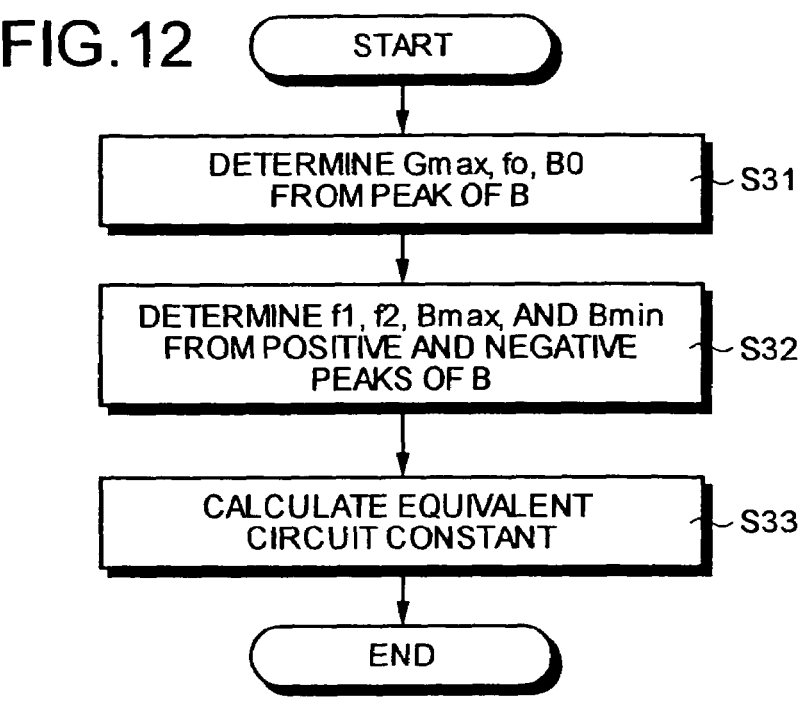
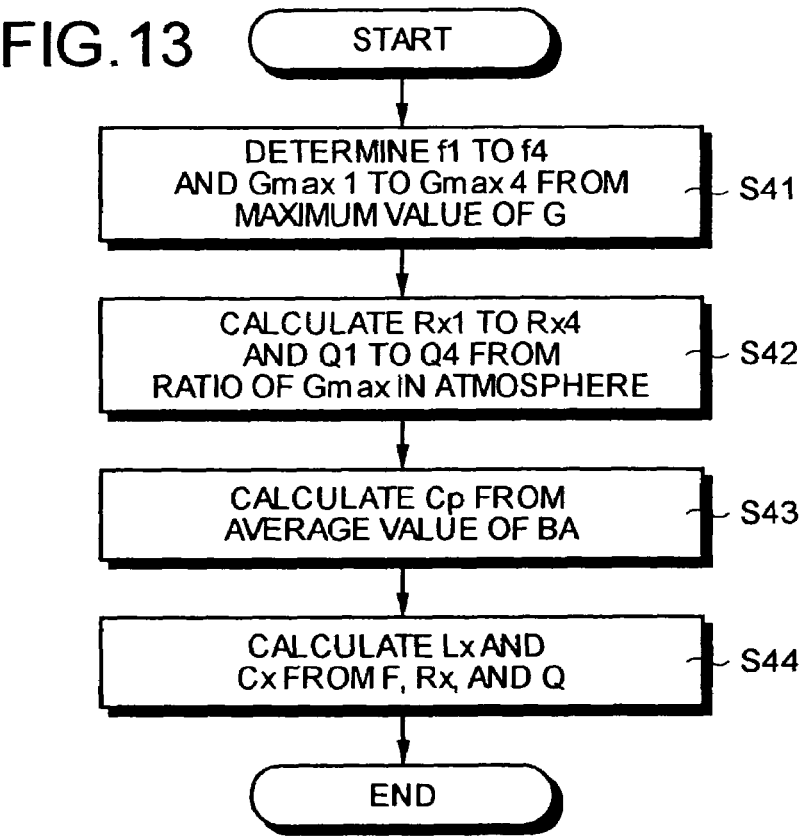

QCM SENSOR AND QCM SENSOR DEVICE

BACKGROUND OF THE INVENTION

1) Field of the Invention

The present invention relates to a QCM (Quartz Crystal Microbalance) sensor that that detects an amount of a substance adsorbed on a piezoelectric transducer based on a change in resonance frequency of the piezoelectric transducer, such as an AT-cut quartz resonator, caused by adsorption (attachment) of a small amount of substance on the piezoelectric transducer.

2) Description of the Related Art

The principle of measurement by a QCM sensor device, if the resonance frequency is denoted by f, a difference in the resonance frequency due to the mass (adsorbed) attached is denoted by $\Delta f$, and a change in mass is denoted by $\Delta m$, the change in the resonance frequency denoted by Sauerbrey's equation (1) disclosed in (pages 918 to 929 of) 'Development of piezoelectric bio-sensor and latex piezoelectric element immunoassay for clinical examination' published in pages 917 to 930 of No. 12, Vol. 46 of BUNSEKI KAGAKU (ANALYTICAL CHEMISTRY) (1997) is as follows:

$$\Delta f = -K \cdot f^2 \cdot \Delta m \tag{1}$$

(where K is a constant depending on the area of an electrode, density, and an elastic constant of a material of the quartz crystal).

It is clear from equation (1) that, if the difference $\Delta f$ in the resonance frequencies of the AT-cut quartz resonator before and after the adsorption (attachment) of the mass can be measured, it is possible to calculate the mass adsorbed (attached) $\Delta m$. Moreover, if a piezoelectric transducer having high resonance frequency is used, it is possible to increase the sensitivity of the mass detection. For example, if a quartz crystal resonator having resonance frequency 9 megahertz (MHz) is used, for a change of 1 nanogram (ng) in mass, there is a change of about 1 Hz in the frequency. In other words, if a quartz crystal resonator is made to oscillate by an oscillating circuit and an output is measured by a frequency counter, it is possible to have simple and highly sensitive measurement of a change in the mass. Moreover, when the quartz crystal resonator is used in a liquid, the resonance frequency changes depending on the viscosity and the density of the liquid so that the viscosity and the density of the liquid can be determined from the resonance frequency.

Gas sensors or odor sensors which can detect even a small amount of toxic material in the atmosphere have been drawing attention. Moreover, in recent years, due to the development in a technology that makes oscillate the piezoelectric transducer in a solution, bio sensors or chemical sensors which sense organic compounds and bio-molecules have been drawing attention (Refer to 'Examples of Biochemical Acoustic Wave Sensor' published in pages 307 to 308 of ACOUSTIC WAVE SENSORS by ACADEMIC PRESS (ISBN 0-12-077460-7) and (pages 918 to 929) 'Development of piezoelectric bio-sensor and latex piezoelectric element immunoassay for clinical examination' published in pages 917 to 930 of No. 12, Vol. 46 of BUNSEKI KAGAKU (ANALYTICAL CHEMISTRY) (1997)).

Moreover, in recent years, as in the case of analysis of human genome, methods for analyzing a very large number of samples simultaneously and speedily have been established. This has led to an increased demand for high throughput to bio-analytical equipments other than those employing DNA sequencing. Even in QCM sensors, in the field of proteomix (comprehensive analysis of proteins) or drug discovery, there has been increasing need to analyze an interaction between a large number of proteins for all combinations and multi-channeling has been sought.

In conventional QCM sensor devices, devices that measures one sample at a time have been predominant. However, multi-channeling can be realized comparatively easily by arranging a plurality of measurement cells in which the quartz crystal resonators are mounted and arranging simultaneously a measurement circuit that measures the resonance frequency of a plurality of resonators.

In the conventional multi-channel QCM sensors, terminals of a plurality of resonators in which a quartz substrate is arranged in two-dimensions are connected in the form of a matrix. A wiring in the direction of X and a wiring in the direction of Y are switched by a switching circuit like a relay etc. and only a resonator at an intersection of the wiring selected is connected to the oscillating circuit. Thus, the number of wiring was reduced (refer to the technology disclosed in paragraphs 0048 to 0051 and FIG. 3 of Japanese Patent Application Laid-open Publication No. 2000-338022).

In FIG. 3 of the Japanese Patent Application Laid-open Publication No. 2000-338022, reference numeral 51 denotes a multi-channel QCM sensor device provided with a plurality of oscillating domains on a quartz crystal substrate and A to I denote working electrodes and are oscillating domains for each electrode. Rear electrodes are disposed on a rear surface of the oscillating domains. The working electrodes are connected commonly in a vertical direction in the diagram to terminals 521, 522, and 523. The rear electrodes are connected commonly in a horizontal direction to terminals 531, 532, and 533. A vertical wiring is selected by a change-over switch 55 and a horizontal wiring is selected by a change-over switch 56. A working electrode and a rear electrode of an oscillating domain selected are connected to a oscillating circuit or an impedance-measurement circuit 54 and the resonance frequency is measured. A controller 57 specifies the vertical direction and the horizontal direction from a plurality of piezoelectric-transducer (piezoelectric-oscillating) fields and selects one piezoelectric transducer field.

However, in the conventional QCM sensor disclosed in paragraphs 0048 to 0051 and FIG. 3 of Japanese Patent Application Laid-open Publication No. 2000-338022, in nine piezoelectric-transducer fields, 18 wires necessary for leading out to all the working electrodes and the rear electrodes can be reduced to 6 by connecting in the matrix form; however, 6 wires and 2 change-over switches are still required. Furthermore, in Japanese Patent Application Laid-open Publication No. 2000-338022, one piezoelectric-transducer field is selected from a plurality of the piezoelectric-transducer fields and the resonance frequency is measured for the selected piezoelectric-transducer field. The measurement of the resonance frequency has to be repeated as many times as the number of the piezoelectric-transducer fields. Due to this, time required for one measurement point is long. Particularly, when the resonance frequency is measured by the oscillating frequency, it takes a long time for the stopped oscillations to reach stable oscillations. As a result, the time required for measurement becomes long which is a drawback. In addition, an operation of the change-over switch further complicates the measurement.

SUMMARY OF THE INVENTION

It is an object of the present invention to solve at least the problems in the conventional technology.

A quartz crystal microbalance sensor according to an aspect of the present invention detects a change in resonance frequency of a piezoelectric transducer caused by adsorption of a substance on a surface of the piezoelectric transducer. The quartz crystal microbalance sensor includes a plurality of piezoelectric transducers, each piezoelectric transducer having a pair of electrodes including a first electrode and a second electrode; a pair of connecting lines including a first connecting line that is commonly connected to each of the first electrodes of the piezoelectric transducers and a second connecting line that is commonly connected to each of the second electrodes of the piezoelectric transducers; and a pair of terminals including a first terminal that is connected to the first connecting line and a second terminal that is connected to the second connecting line.

A quartz crystal microbalance sensor according to an aspect of the present invention detects a change in resonance frequency of a piezoelectric transducer caused by adsorption of a substance on a surface of the piezoelectric transducer. The quartz crystal microbalance sensor includes a plurality of piezoelectric transducers, each piezoelectric transducer having a substrate, the substrate having a plurality of oscillating domains, one of the oscillating domains is used as a target oscillating domain and remaining oscillating domains are used for measurement of a sample; a plurality of pair of electrodes including a first electrode and a second electrode, each pair of electrodes corresponding to each oscillating domain on the substrate to drive the corresponding oscillating domain; a pair of connecting lines including a first connecting line that is commonly connected to each of the first electrodes of the piezoelectric transducers and a second connecting line that is commonly connected to each of the second electrodes of the piezoelectric transducers; and a pair of terminals including a first terminal that is connected to the first connecting line and a second terminal that is connected to the second connecting line.

A quartz crystal microbalance sensor device according to an aspect of the present invention includes a quartz crystal microbalance sensor. The quartz crystal microbalance sensor includes a plurality of piezoelectric transducers, each piezoelectric transducer having a pair of electrodes including a first electrode and a second electrode, each piezoelectric transducer oscillating at a predetermined resonance frequency; and a pair of terminals including a first terminal that is commonly connected to each of the first electrodes of the piezoelectric transducers and a second terminal that is commonly connected to each of the second electrodes of the piezoelectric transducers; and a resonance-frequency measuring unit that is connected to the pair of terminals of the quartz crystal microbalance sensor and that measures a change in resonance frequency of each of the piezoelectric transducers, wherein the change in resonance frequency of each of the piezoelectric transducers is caused by adsorption of a substance on a surface of the piezoelectric transducer, and calculates a mass of the substance deposited on the surface of the piezoelectric transducer from the change in resonance frequency measured by the resonance-frequency measuring unit.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 12 is a flow chart of a process procedure for calculating initial values of equivalent circuit constants when there is one resonance point;

FIG. 13 is a flow chart of a process procedure for calculating initial values of equivalent circuit constants when there are a plurality of resonance points;

DETAILED DESCRIPTION

Exemplary embodiments of a QCM sensor and a QCM sensor device according to the present invention are described below with reference to the accompanying diagram.

Figure 1:
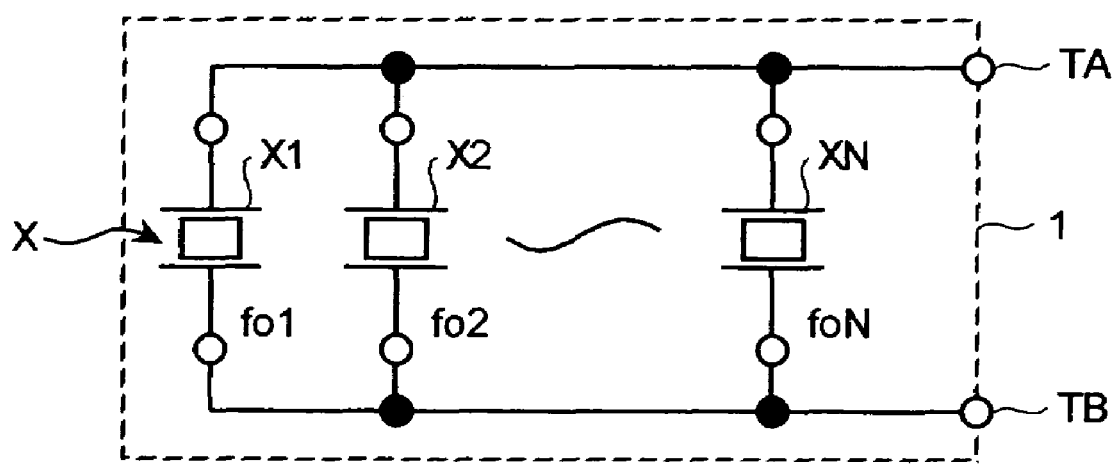
FIG. 1 is a diagram of a QCM sensor that is used in a QCM sensor device according to a first embodiment of the present invention.
Figure 2:
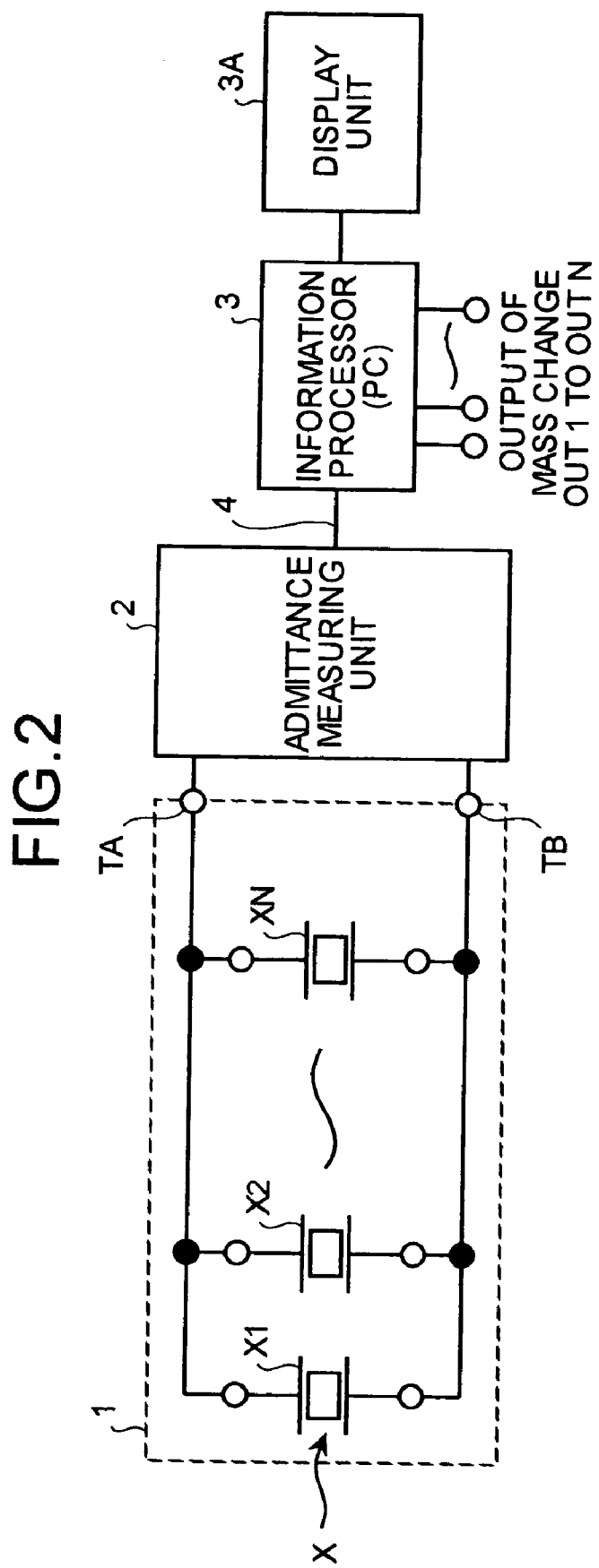
FIG. 2 is a diagram of the QCM sensor device.

FIG. 1 is a diagram of a QCM sensor in a QCM sensor device according to a first embodiment of the present invention. FIG. 2 is a diagram of structure of the QCM sensor device.

A QCM sensor 1 includes a plurality of AT-cut quartz crystal resonators X (X1, X2, . . . , XN) which are piezoelectric transducers. The quartz crystal resonators X1, X2, . . . , XN have resonance frequencies fo1, fo2, . . . , foN, respectively. The quartz crystal resonators are connected in parallel with each other and one electrode of each quartz crystal resonator is connected to a connecting terminal TA and other electrode of each quartz crystal resonator is connected to a connecting terminal TB.

The connecting terminals TA and TB are connected to two measuring terminals of an admittance measuring unit 2 (see FIG. 2). Because the quartz crystal resonators X1, X2, . . . , X3 are connected in parallel, the admittance measured in the admittance measuring unit 2 is a combined admittance of all the quartz crystal resonators X1, X2, . . . , X3. Admittance data 4 of the admittance measured is transmitted to an information processor 3. The information processor 3 calculates the resonance frequency of each quartz crystal resonator. The admittance-measurement unit 2 and the information processor 3 form a resonance-frequency measuring unit. The information processor 3 calculates the mass of a sample at the time of the measurement from the resonance frequencies. A display unit 3A displays calculation results of the information processor 3.

Figure 3:
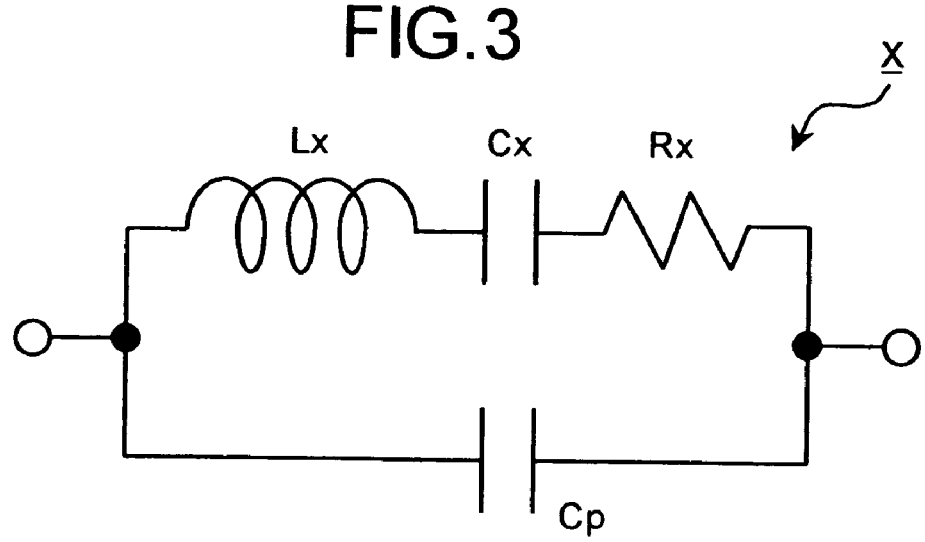
FIG. 3 is an equivalent circuit of a quartz crystal resonator in the QCM sensor.

Now, an explanation will be given about the admittance characteristics of an equivalent circuit when there is only one quartz crystal resonator. FIG. 3 is an equivalent circuit of the quartz crystal resonator. The quartz crystal resonator X can be expressed as a series resonance circuit that includes an inductor Lx, a capacitor Cx, and a resistor Rx and as a parallel resonance circuit that includes a parallel-connected capacitor Cp that has capacitance of an electrode and capacitance of a wire that is connected to the electrode.

Figure 4:
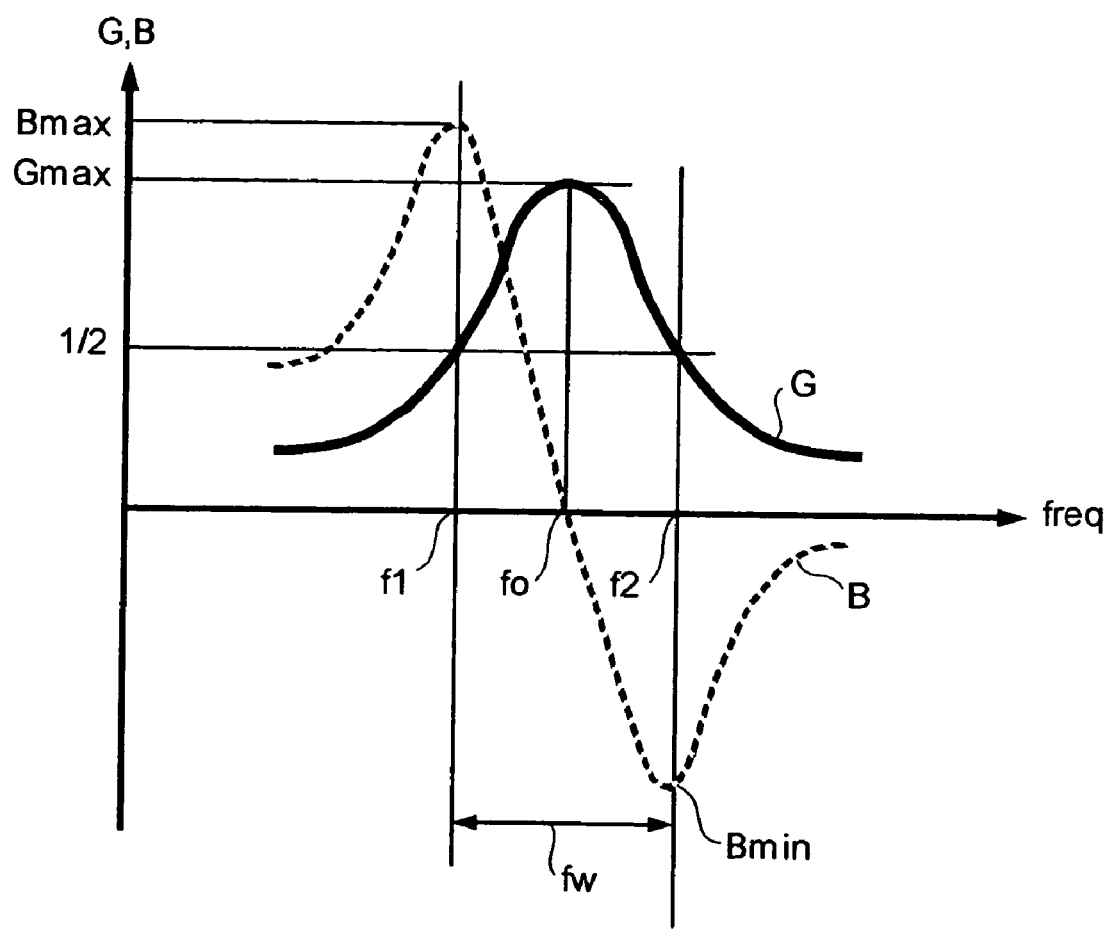
FIG. 4 is a graph of admittance characteristics of the equivalent circuit shown in FIG. 3.

FIG. 4 is a graph of the admittance characteristics of the equivalent circuit shown in FIG. 3. In the graph, frequency is plotted on the horizontal axis and a real part G (i.e., conductance) and an imaginary part B (i.e., susceptance) of the admittance are plotted on the vertical axis. The real part G of the admittance reaches the maximum value Gmax at the resonance frequency fo. If f1 and f2 are the frequencies at which the real part G falls to half it's value, then the difference fw in frequencies f1 and f2 is equal to a value that is obtained when fo is divided by a quality factor Q. Moreover, the imaginary part B reaches the maximum value Bmax at the frequency f1 and reaches the minimum value Bmin at the frequency f2.

Figure 5:
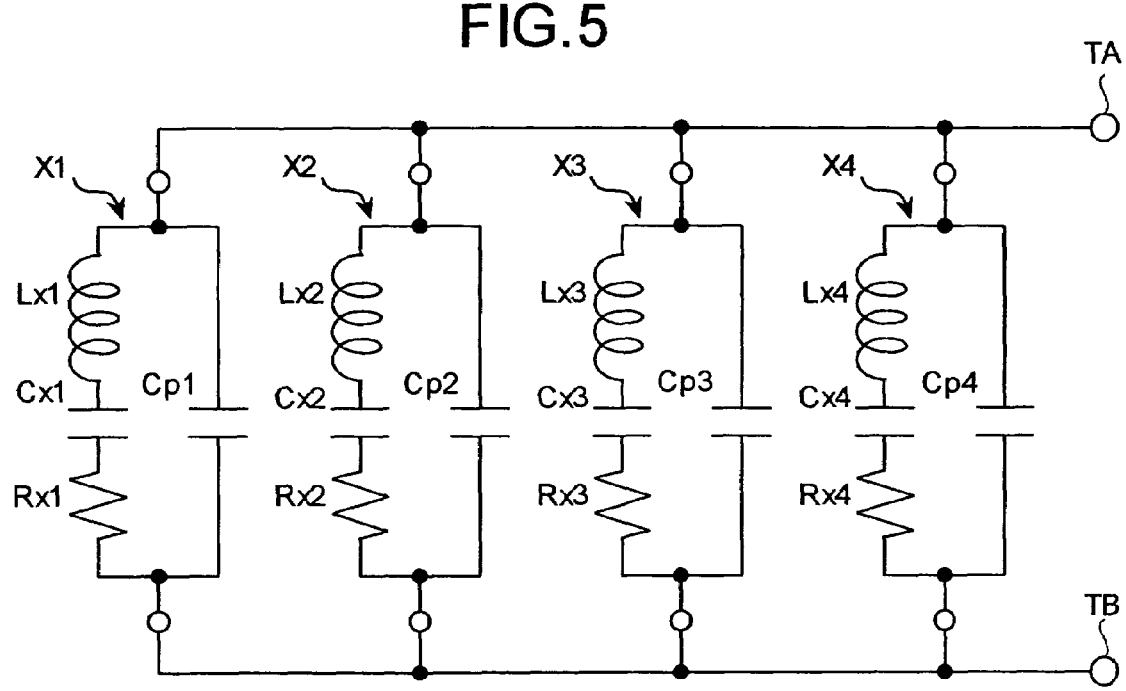
FIG. 5 is an equivalent circuit in which four quartz crystal resonators are connected in parallel.

FIG. 5 is an equivalent circuit in which four quartz crystal resonators are connected in parallel. An equivalent circuit and admittance characteristics when four quartz crystal resonators having frequencies that differ by fw are connected in parallel are described below. Equivalent circuit constants have values Lx1 to Lx4, Cx1 to Cx4, Rx1 to Rx4, and Cp1 to Cp4 corresponding to the quartz crystal resonators X1 to X4.

Figure 6:
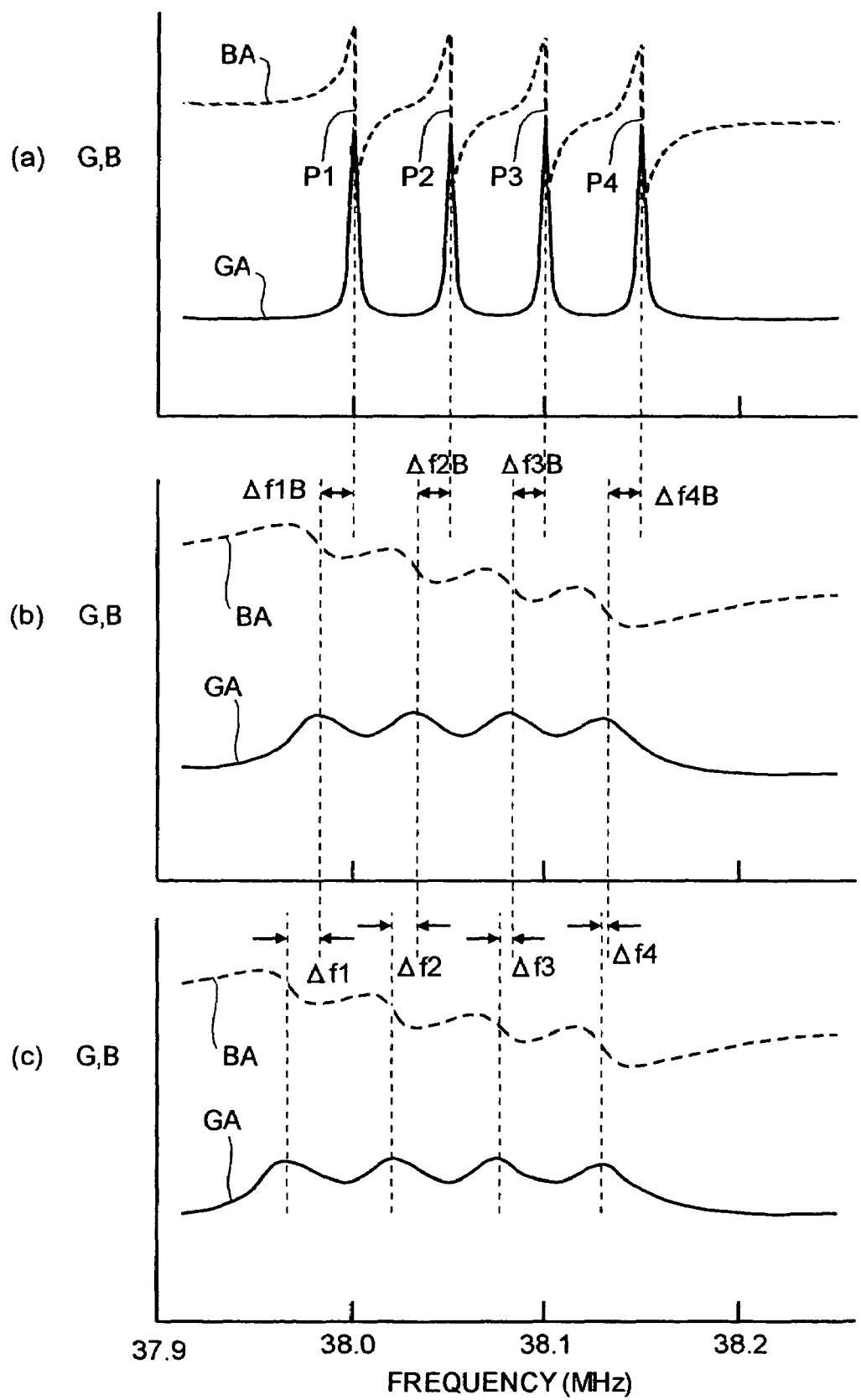
FIG. 6 is a graph of admittance characteristics of the equivalent circuit shown in FIG. 5.

FIG. 6 are graphs of the admittance characteristics of the equivalent circuit shown in FIG. 5. The graph (a) is a plot of the admittance characteristics when the sample is in the atmosphere, the graph (b) is a plot of the admittance characteristics when the sample is in a buffer solution like physiological salt solution, and the graph (c) is a plot of the admittance characteristics when the sample is added drop wise to a buffer solution. In these graphs, represent frequency is plotted on the horizontal axes and admittance (rear part G and imaginary part B) is plotted on the vertical axes. The solid line GA corresponds to the real part G (conductance) of the combined admittance and the dotted line BA corresponds to the imaginary part B (susceptance) of the combined admittance. Characteristics shown in FIG. 6 are visualization of the admittance data 4 that is output from the admittance measuring unit 2 (see FIG. 2).

In the atmosphere, as clear from the graph (a), the resonance points P1, P2, P3, and P4 of the four quartz crystal resonators are separated distinctly and sharply. In the buffer solution, as clear from the graph (b), when a quartz crystal of 38 MHz is added to the buffer solution from air (the atmosphere), the resonance frequency of each quartz crystal resonator decreases by about 20 MHz (change of $\Delta f1B$, $\Delta f2B$, $\Delta f3B$, and $\Delta f4B$ in the resonance frequency). Further, as clear from the graph (c), when the sample is added drop wise, there is a change in the frequency ($\Delta f1$, $\Delta f2$, $\Delta f3$, and $\Delta f4$) of resonators corresponding to the sample.

Thus, by soaking the quartz crystal resonator in the buffer solution, or by adding the sample drop wise in the buffer solution, there is a change in the resonance frequencies and the resonance points tend to change smoothly. When the four quartz crystal resonators are connected in parallel, a combined admittance GA of the quartz crystal resonators X1 to X4 is obtained. The combined conductance GA is in the form of four connected mountains. On the other hand, the combined susceptance BA is converged to the maximum value near low resonance, goes on fluctuating as the resonance frequency becomes higher, and is converged to minimum value at high resonance frequency. Due to the difference in the resonance frequencies of the quartz crystal resonators of about fw (38 KHz), resonance points of conductance G of the four quartz crystal resonators X1 to X4 can be separated from each other. Further, by using the method of least squares mentioned in the latter part, a constant for all elements of the equivalent circuit shown in FIG. 5, the resonance frequencies fo1 to f04 of the quartz crystal resonators, and the Q factor can be calculated precisely.

Figure 7:
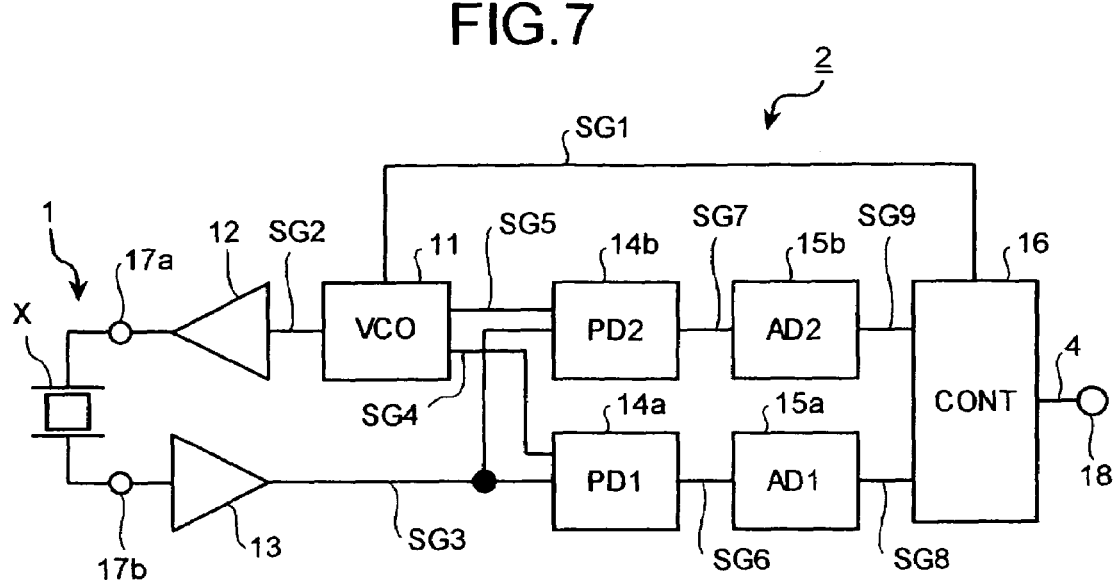
FIG. 7 is a block diagram of an admittance measuring unit.

FIG. 7 is a block diagram of the admittance measuring unit 2. The admittance measuring unit 2 includes a voltage controlled oscillator (VOC) 11, an output amplifier 12, an input amplifier 13, a pair of phase detectors PD1 (14a) and PD2 (14b), a pair of A/D converters AD1 (15a) and AD2 (15b), and a control circuit (CONT) 16. The VOC 11 performs sweeping drive of the quartz crystal resonator X in a desired frequency range. The input amplifier 13 amplifies an input signal which is a drive signal that is transmitted through the quartz crystal resonator X. The phase detector PD1 (14a) detects the signal strength of a real part of the input signal and the phase detector PD2 (14b) detects the signal strength of an imaginary part of the input signal. The CONT 16 performs the overall control.

The quartz crystal resonator X (X1 to XN shown in FIG. 1) which is provided as an element to be measured in the QCM sensor 1, is connected to an output terminal 17a and an input terminal 17b. The VCO 11 performs sweeping oscillations of a sine wave with a desired frequency range in sweeping time by a control voltage SG1 that is output from the CONT 16. The output amplifier 12 performs power amplification of the sine wave signal and the sine wave signal is then output from the output terminal 17a.

A sine wave signal output that is output from the output terminal 17a is supplied to the quartz crystal resonator X. An output from the quartz crystal resonator X is input to the input terminal 17b. The input amplifier 13 amplifies an input signal to obtain an amplified signal SG3. The amplified signal SG3 is input to the phase detectors PD1 (14a) and PD2 (14b). The VCO 11 outputs a real-part phase-signal SG4 that is used for the phase detection by the phase detector PD1 (14a). The real-part phase-signal SG4 has the same phase as the input signal SG3. The VCO 11 outputs an imaginary-part phase-signal SG5 that has a phase difference of 90 degrees from that of the amplified signal SG3 to the phase detector PD2 (14b) of the imaginary part.

The phase detector PD1 (14a) outputs an analog signal SG6 that has undergone phase detection by the real-part phase-detection signal SG4 and is proportional to the real part of the admittance. On the other hand, the phase detector PD2 (14b) outputs an analog signal SG7 that has undergone phase detection by the imaginary-part phase-detection signal SG5 and is proportional to the imaginary part of the admittance.

The A/D converters AD1 (15a) and AD2 (15b) converts the analog signals SG6 and SG7 to digital data SG8 and SG9. The CONT 16 converts the digital signals SG8 and SG9 to a suitable format. The digital signals converted to the suitable format are output to the information processor 3 (see FIG. 2) via a digital interface 18. The output is the admittance data 4 shown in FIG. 2.

In this example, a direct conversion type arrangement in which the input signal SG3 is allowed to undergo phase detection directly by using the phase signals SG4 and SG5 having the same frequency as that of the input signal SG3, is used. Without limiting to this arrangement, a single conversion type arrangement in which the input signal SG3 is converted to a signal having an intermediate frequency and then allowed to under go phase detection or a double conversion type arrangement in which the intermediate frequency is converted in two stages can also be used.

The admittance measuring unit 2 sweeps the resonance frequency of the four quartz crystal resonators X1 to X4 in a range that covers the resonance frequency with a tolerance of about fw and measures the admittance characteristics shown in FIG. 6. In this case, regarding the frequency range, the resonance frequency is swept in one continuous frequency domain. There may be different frequency domains corresponding to the resonance frequencies of individual quartz crystal resonators. According to the first embodiment, the admittance is measured by the admittance measuring unit 2 which is a resonance-frequency measuring circuit. However, the present invention is not limited to the measurement of admittance by the admittance measuring unit 2 and equivalent circuit constants for all the quartz crystal resonators can be calculated separately by the calculation of impedance measurement etc.

In this case, the admittance measuring unit 2 can measure the admittance while sweeping the frequency and a general purpose network analyzer or an impedance analyzer can also be used as the admittance measuring unit. NETWORK ANALYZER E5100A manufactured by AGILENT CO. LTD. can be used as the admittance measuring unit 2.

The admittance data 4 that is output from the admittance measuring unit 2 is input to the information processor 3. The information processor 3 may be a personal computer (PC), or a central processing unit (CPU) with specialized software assembled in it, or specialized hardware. The information processor 3 calculates equivalent circuit constants of a resonance circuit of the quartz crystal resonators X1, X2, . . . , XN by a calculation process using the method of least squares from the change in admittance at the frequencies acquired in (by) the admittance measuring unit 2. The information processor 3 then calculates the resonance frequency by (from) the equivalent circuit constants. The information processor 3, by using mass sensitivity that is calculated in advance, performs calculation to convert the change in the resonance frequency to mass change and outputs to outputs of mass change OUT1 to OUTN. The admittance measuring unit 2 and the information processor 3 can be connected to each other by a general purpose interface bus (GPIB) interface.

In the information processor 3, from the admittance characteristics at each resonance frequency acquired in the admittance measuring unit 2, the equivalent circuit constants when the quartz crystal resonators X1 to XN are connected in parallel is predicted by a mathematical method like the method of least squares. The resonance frequencies of the quartz crystal resonators are calculated independently from the equivalent circuit constants. An arrangement can be made such that the resonance frequency is calculated directly without calculating the equivalent circuit constants in the information processor 1. However, once the conversion is applied to the equivalent circuit constants, the Q factor etc. can be calculated easily, thereby elevating the analyzing capability of the QCM sensor device.

Figure 8:
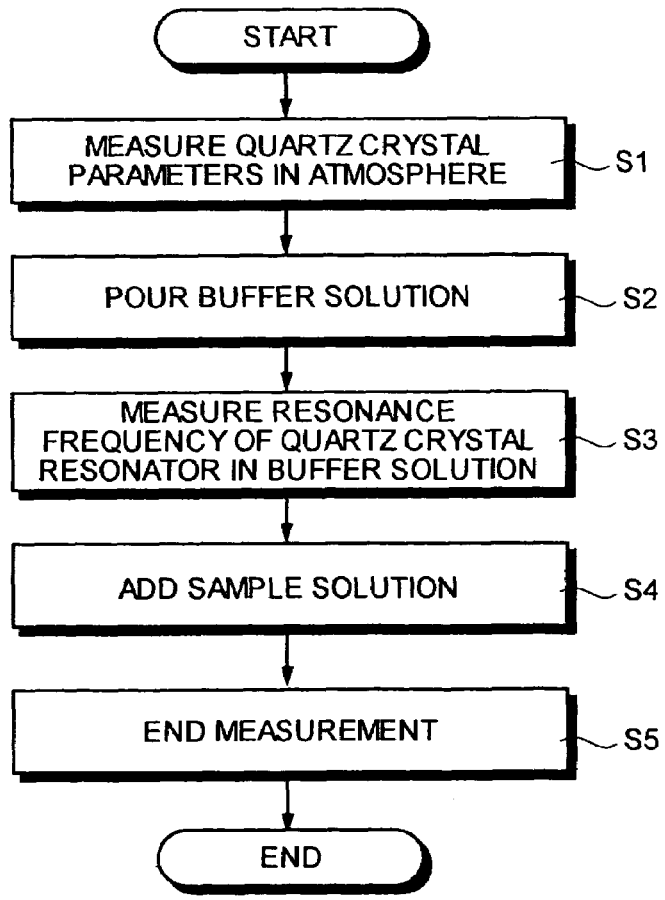
FIG. 8 is a flow chart of a process procedure for measuring a sample using the QCM sensor device.
Figure 9:
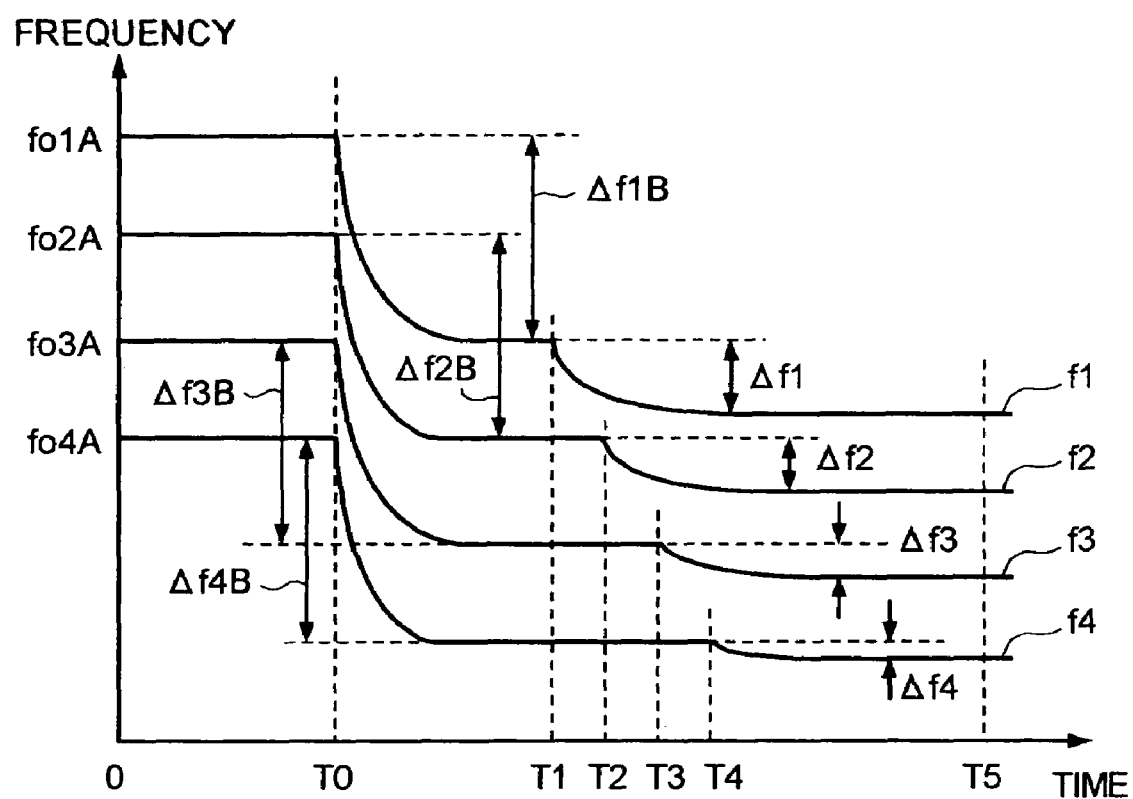
FIG. 9 is a time chart of a change in the resonance frequency upon measurement by using a plurality of quartz crystal resonators having different resonance frequencies.

FIG. 8 is a flow chart of a process procedure for measuring a sample using the QCM sensor device and FIG. 9 is a time chart of a change in the resonance frequency upon measurement by using a plurality of quartz crystal resonators having different resonance frequencies. Time is plotted on the horizontal axis and frequency is plotted on the vertical axis. A change in the four resonance frequencies corresponding to situations shown in graphs (a) to (c) in FIG. 6 is indicated.

To start with, quartz crystal parameters are measured in the atmosphere (air) (step S1). The quartz crystal parameters include the equivalent circuit constants (Lx, Cx, Rx, and Cp), the resonance frequency f, the Q factor, the maximum value Gmax of the real part G (conductance) of the admittance, the maximum value Bmax of the imaginary part B (susceptance) of the admittance, the frequency f1 at which the imaginary part B has the maximum value Bmax, the minimum value Bmin, the frequency f2 at which the imaginary part B has the minimum value Bmin, and the resonance frequency fo at which the real part G has the maximum value Gmax. A period of measurement is from 0 to T0 in FIG. 9 and resonance frequencies fo1A to fo4A of the quartz crystal resonators X1 to X4 respectively are acquired (equivalent to situations in graph (a) of FIG. 6). The parameters acquired are used to predict initial values in the method of least squares for calculating the resonance frequency in the buffer solution.

Further, the buffer solution is poured in a receptacle (like a well) (step S2). The buffer solution is poured at time T0 in FIG. 9. Because of the dipping the quartz crystal resonator X to the buffer solution, the resonance frequency decreases by about 20 KHz and also the Q factor falls down to about 1000. The resonance frequency and the Q factor start decreasing as soon as the electrodes of the resonator come in contact with the buffer solution. Therefore after a rapid decrease in the resonance frequency, the frequency changes gradually and is then stabilized. After few seconds till the resonance frequency of the quartz crystal resonator is stabilized upon pouring of the buffer solution at time T0 at step S2, the resonance frequency measuring unit (the admittance measuring unit 2 and the information processor 3) displays measurement results in the form of values or a graph on the display unit 3A.

After stabilizing of the change in the resonance frequency of the quartz crystal resonator X, the resonance frequency of the quartz crystal resonator X in the buffer solution is measured (step S3). The resonance frequency changes by an amount of $\Delta f1b$, $\Delta f2b$, $\Delta f3B$, and $\Delta f4B$ shown in FIG. 9 (situation equivalent to that in graph (b) of FIG. 6).

Further, a sample solution that contains a substance to be measured is added (step S4). The sample solution is added from time T1 until time T4. As a result, the frequency of the resonator changes with the amounts of change $\Delta f1B$, $\Delta f2B$, $\Delta f3B$, and $\Delta f4B$ corresponding to the sample. By observing the change in the resonance frequency, the mass of the sample can be calculated based on the amount of change $\Delta f1$, $\Delta f2$, $\Delta f3$, and $\Delta f4$ (situation equivalent to that in graph (b) of FIG. 6). When the change in the resonance frequency is stabilized sufficiently, (at time T5), the measurement is ended (step S5). In the case shown in FIG. 9, the time at which each of the four samples is added, i.e., T1 to T4, is different; however, the four samples may be added at a time.

Figure 10:
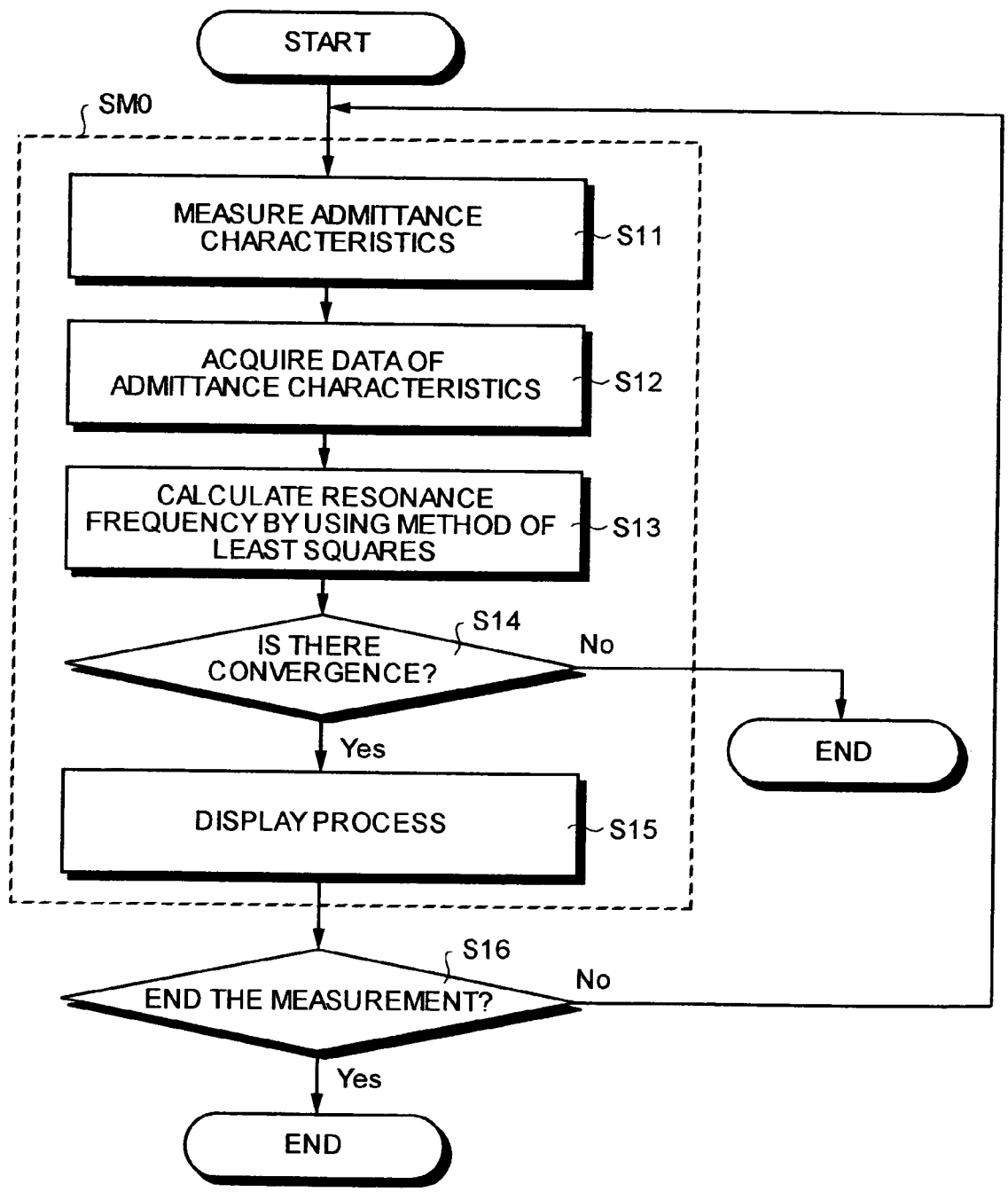
FIG. 10 is a flow chart of a process procedure for measuring when the quart crystal resonators have same or different resonance frequencies.

The measurement process is described below in detail. Particularly, the measurement of admittance by the admittance measuring unit 2 and the calculation of the resonance frequency by the information processor 3 are described in detail. FIG. 10 is a flow chart of a process procedure for the measurement when there the resonance frequencies of the quartz crystal resonators are same or different. The process procedure shown in FIG. 10 corresponds to the step S3 in FIG. 8. The measurement is ended by a command at step S5 in FIG. 8.

A continuous measurement loop shown in FIG. 10 is a series of measurement process (SM0) from step S11 to step S15. To start with, by a command from the information processor 3 (see FIG. 2) the admittance measuring unit 2 measures the admittance characteristics of the quartz crystal resonator X (step S11). The admittance is measured by frequency sweeping by (in) a predetermined frequency range and time. Concretely, the admittance is measured by sweeping a frequency range that covers the resonance frequencies f1 to f4 of the quartz crystal resonator during the time T0 to T5 in FIG. 9.

Further, the information processor 3 acquires the admittance data 4, which is digital data (step S12). Then, the information processor 3 calculates the resonance frequency of the quartz crystal resonator X (X1 to X4) by using the method of least squares for the admittance data 4 (step S13). Details of calculations by the method of least square are mentioned in latter.

Further, it is decided whether the result of the method of least squares has converged (step S14). If the result has not converged, for example due to inability to obtain a normal value by calculation ("No" at step S14), the measurement is stopped. The situation is displayed on the display unit 3A of the information processor 3 and the continuous measurement by the series of measurements (SM0) is ended. Moreover, since there is also a possibility of the process ending abnormally due to an accidental occurrence like measurement noise etc., if the values are not converged even after trying the process from steps S11 through S13 repeatedly ("No" at step S14), the continuous measurement may be ended.

If the result has converged ("Yes" at step S14) and normal values are obtained, the resonance frequency of each quartz crystal resonator X (X1 to X4) obtained by calculation by the method of least squares at step S13, the values are displayed in figures or graphically on the display unit 3A (step S15). Further, it is decided whether to end the measurement (step S16). If an end measurement (step S5 in FIG. 8) command is not there ("No" at step S16), the measurement process SM0 is repeated till the end measurement command is received. If the end measurement command is received ("Yes" at step S16), the resonance frequency measuring unit ends the continuous measurement.

The calculation of the resonance frequency by the method of list squares performed by the information processor 3 is described below. The information processor 3 performs calculation based on the admittance output from the admittance measuring unit 2.

A process to calculate the resonance frequencies of the quartz crystal resonators X (X1 to X4) are by (from) the admittance characteristics shown in the admittance data 4 is performed in two stages.

1. By using a method of nonlinear least-squares, equivalent circuit constants of the quartz crystal resonators X (X1 to X4) are calculated from the admittance characteristics, and
2. Resonance frequencies fo and Q factor of the quartz crystal resonators X (X1 to X4) are calculated from the equivalent circuit constants obtained in stage 1.

1. A Method of Calculating the Equivalent Circuit Constants by the Method of Nonlinear Least-squares.

A mathematical model of the quartz crystal resonator is decided and the method of least squares is applied. The mathematical model expresses by equation, the change in admittance at the frequency of the equivalent circuit. Since an unknown figure to be calculated is equivalent circuit constants, the admittance is considered as a function of the equivalent circuit constants. Lx, Cx, Rx, and Cp in the equivalent circuit denote series inductance, series capacitance, series resistance, and parallel capacitance respectively. The measured value of admittance in a frequency range is obtained as the admittance data 4. The method of least squares is used to calculate the most reliable equivalent circuit constants corresponding to the measured value.

In the beginning, since the admittance is nonlinear with respect to the equivalent circuit constants of the quartz crystal, the method of least squares cannot be applied to the nonlinear admittance. Therefore, initial values (predicted values) Lx0, Cx0, Rx0, and Cp0 are set to linearize the mathematical model. The most reliable value is obtained by adding correction values $\delta Lx$, $\delta Cx$, $\delta Rx$, and $\delta Cp$ to the initial values.

The admittance function is linearized by Taylor expansion around the initial values in such a manner that, a difference δYi, which is a difference between measured admittance and admittance obtained from the initial values, has a linear relationship with a correction value δPj of the equivalent circuit. Further, by applying the method of least squares, the correction value δPj (δLx, δCx, δRx, and δCp) can be obtained.

Thus, the most reliable value of the equivalent circuit constants of the quartz crystal resonator can be calculated by finding the initial value and applying the method of least squares. However, if the initial value differs from the theoretical value, applying the correction only once is not sufficient. Further, judgment of convergence and repetition process are performed. If the repetition process is not possible in the judgment of repetition, the process is ended abnormally. While performing the repetition process, the most reliable value obtained by the calculation is taken as initial value. The initial value is updated and the again correction-calculation is performed.

If a judgment of conversion is made, the equivalent circuit constants are calculated. The equivalent circuit constants are obtained by adding the correction value to the initial value. The series inductance Lx, the series capacitance Cx, the series resistance Rx, and the parallel capacitance Cp is obtained by Lx+δLx, Cx+δCx, Rx+δRx, and Cp+δCp. Calculation of the equivalent circuit constants when there is one quartz crystal resonator X has been described. However, even if there is plurality of the quartz crystal resonators (X1 to XN) connected in parallel, there is an increase in number of the equivalent circuit constants only and mathematical procedure is the same which can be carried out by a similar process as that for one quartz crystal resonator.

2. A Method to Calculate the Resonance Frequency fo and the Q Factor from the Equivalent Circuit Constants If the equivalent circuit constants obtained by the process mentioned above are let to be Lx, Cx, Rx, and Cp, the resonance frequency f and the Q factor can be obtained by the following equations.

$$\text{Resonance frequency } f = 1/(2\pi\sqrt{(Lx \cdot Cx)}) \quad (2)$$

$$Q \text{ factor} = 2\pi \cdot f \cdot Lx/Rx = 1/(2\pi \cdot f \cdot Cx \cdot Rx) \quad (3)$$

Thus, the resonance frequency f and the Q factor of the quartz crystal resonator X can be calculated from the admittance characteristics by a mathematical process using the method of nonlinear least-squares.

Figure 11:
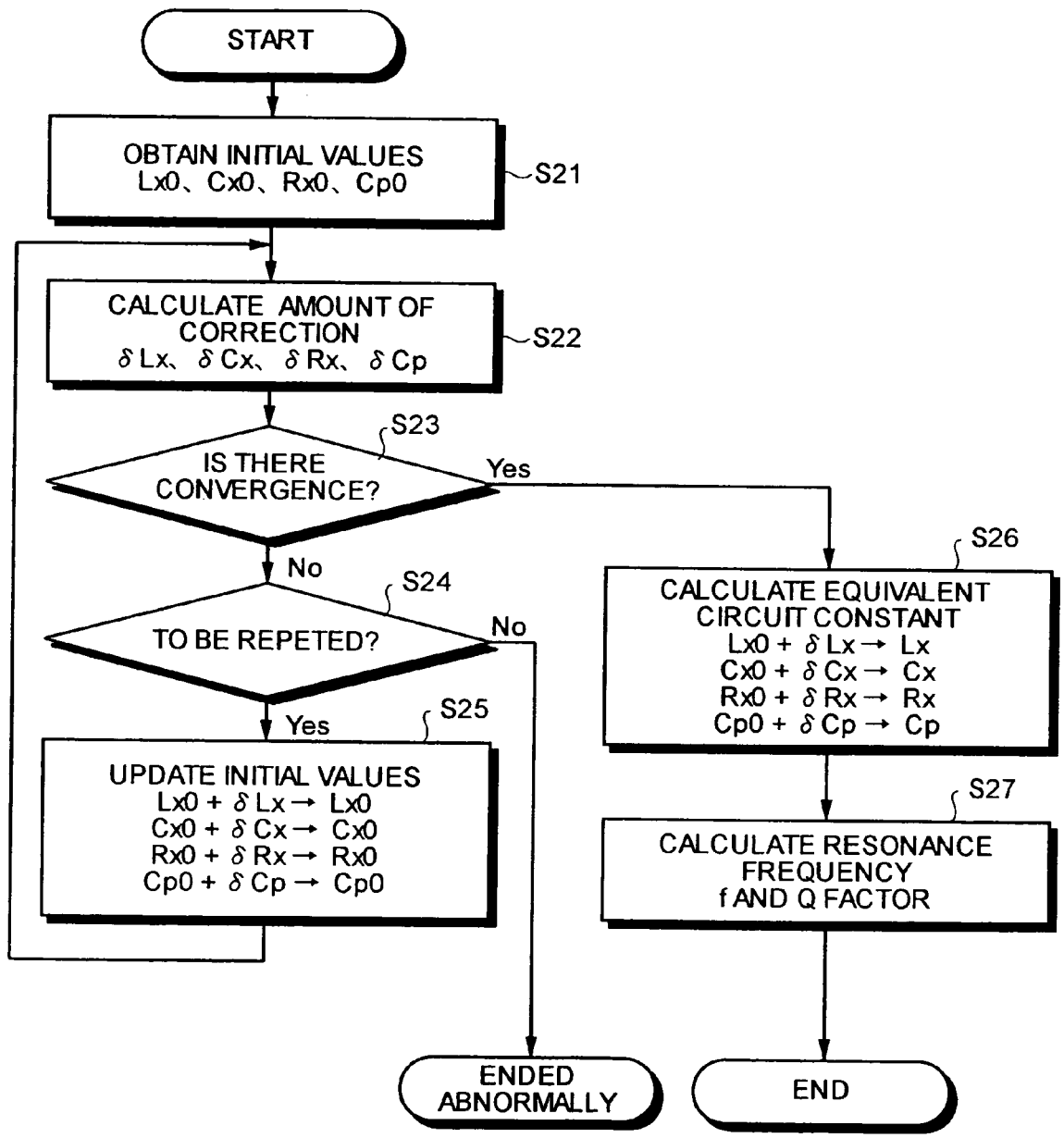
FIG. 11 is a flow chart of a process procedure for calculating the resonance frequency by using a method of least squares.

FIG. 11 is a flow chart of a process procedure for calculation of the resonance frequency by using the method of least squares. To start with, the initial values to be used in the method of least squares are obtained based on the admittance characteristics shown in the admittance data 4 measured in the admittance measuring device 2 (step S21). Then, the amount of correction to the initial values is calculated by the method of least squares (step S22). Further, a judgment of convergence is made (step S23). At this stage, a judgment of whether the amount of correction compared to the initial value is small enough is made. If the amount of correction is small enough, it is judged to be converged ("Yes" at step S23) and if the amount of correction is large, it is judged not to be converged ("No" at step S23). When it is not judged to be converged, the correction is continued further.

If the correction is continued, the repetition judgment is made and a judgment of whether the correction is made for regulated number of times ("No" at step S24) is made. If a judgment of no possibility (chances) of convergence even after repetition the correction is made, the process is ended abnormally. If the correction is not made for regulated number of times ("Yes" at step S24), the correction is continued further. While the correction is continued, the initial values are updated (step S25). Here, a value in which the correction value calculated at step S22 is added to the initial value is used as a new initial value.

Thus the first correction is ended. For applying the second correction, the process returns to step S22. After performing the second correction, if a judgment of convergence is made at step S23 ("Yes" at step S23), step S26 is executed to calculate the resonance frequency. If it is not converged ("No" at step S23), the correction is repeated till the number of times of repetition that is regulated in advance in the judgment of repetition at step 24. The equivalent circuit constants related to the required quartz crystal resonator X is obtained by calculating the value in which the correction value is added to the initial value at step S26 as the equivalent circuit constants. Further, the resonance frequency f and the Q factor are calculated (step S27) and the process is ended.

A method for obtaining an initial value of the equivalent circuit constants in FIG. 11 is described below. A method for calculation of the initial value when the quartz crystal resonator X has one resonance point is different than that when the quartz crystal resonator X has two resonance points. To start with, the method for calculation of the initial value when the quartz crystal resonator X has one resonance point is described.

(1) Method for Calculation of the Initial Values of the Equivalent Circuit Constants when the Quartz Crystal Resonator has One Resonance Point When there is one resonance point, frequencies at three characteristic locations from the admittance characteristics measured are selected. An initial value of the equivalent circuit constants can be obtained by calculation based on an admittance value at each point. The initial value is obtained by selecting resonance frequencies at three locations based on the admittance characteristics of the admittance data that is output from the admittance measuring unit 2 and by calculating from the value of admittance at each location. The initial value is obtained by selecting three frequencies fo, f1, and f2 drawn on the admittance characteristics shown in FIG. 4.

1. Let a value of a real part of the frequency fo at which the real part G of the admittance is maximum, be Gmax, and imaginary part of the admittance, be B0.
2. Let a value of an imaginary part of the frequency f1 at which the imaginary part B of the admittance is maximum, be Bmax.
3. Let a value of an imaginary part of the frequency f2 at which the imaginary part B of the admittance is minimum, be Bmin.

From the values mentioned above, the initial value of the equivalent circuit constants are calculated by using the following equations (4) to (9).

$$\text{resonance frequency } f = fo \text{ or } \sqrt{(f1 \cdot f2)} \quad (4)$$

$$\text{series resistance } Rx = 1/G\text{max} \quad (5)$$

$$Q \text{ factor} = f/(f2 - f1) \quad (6)$$

$$\text{series inductance } Lx = Q \cdot Rx/(2\pi \cdot f) \quad (7)$$

$$\text{series capacitance } Cx = 1/(2\pi \cdot f \cdot Q \cdot Rx) \quad (8)$$

$$\text{parallel capacitance } Cp = B0/(2\pi \cdot f) \text{ or} \quad (9)$$
$$= (B\max + B\min)/(4\pi \cdot f)$$

FIG. 12 is a flow chart of a procedure for calculating the initial values of the equivalent circuit constants when there is one resonance point. The INITIAL VALUES are rough values of the equivalent circuit constants which are used for starting the calculation by the method of least squares. The initial values can be calculated irrespective of whether in the buffer solution or in the atmosphere.

To start with, a real part G (conductance) of the admittance data measured is searched and the maximum value (peak value) of the real part G, the frequency fo at the maximum value, and an imaginary part (susceptance) B0 are determined (step S31). Further an imaginary part B (susceptance) of the admittance data is searched and frequencies f1 and f2 of peak values of a positive and negative peaks of the imaginary part B are determined (step S32). Then, the resonance frequency f, the series resistance Rx, the Q factor, the series inductance Lx, the series capacitance Cx, and the parallel capacitance Cp are calculated according to the equations (4) to (9) (step S33).

(2) Method for Calculation of the Initial Values of the Equivalent Circuit Constants in the Buffer Solution when the Quartz Crystal Resonator has a Plurality of Resonance Points (in this Case Four Resonance Points)

Figure 14:
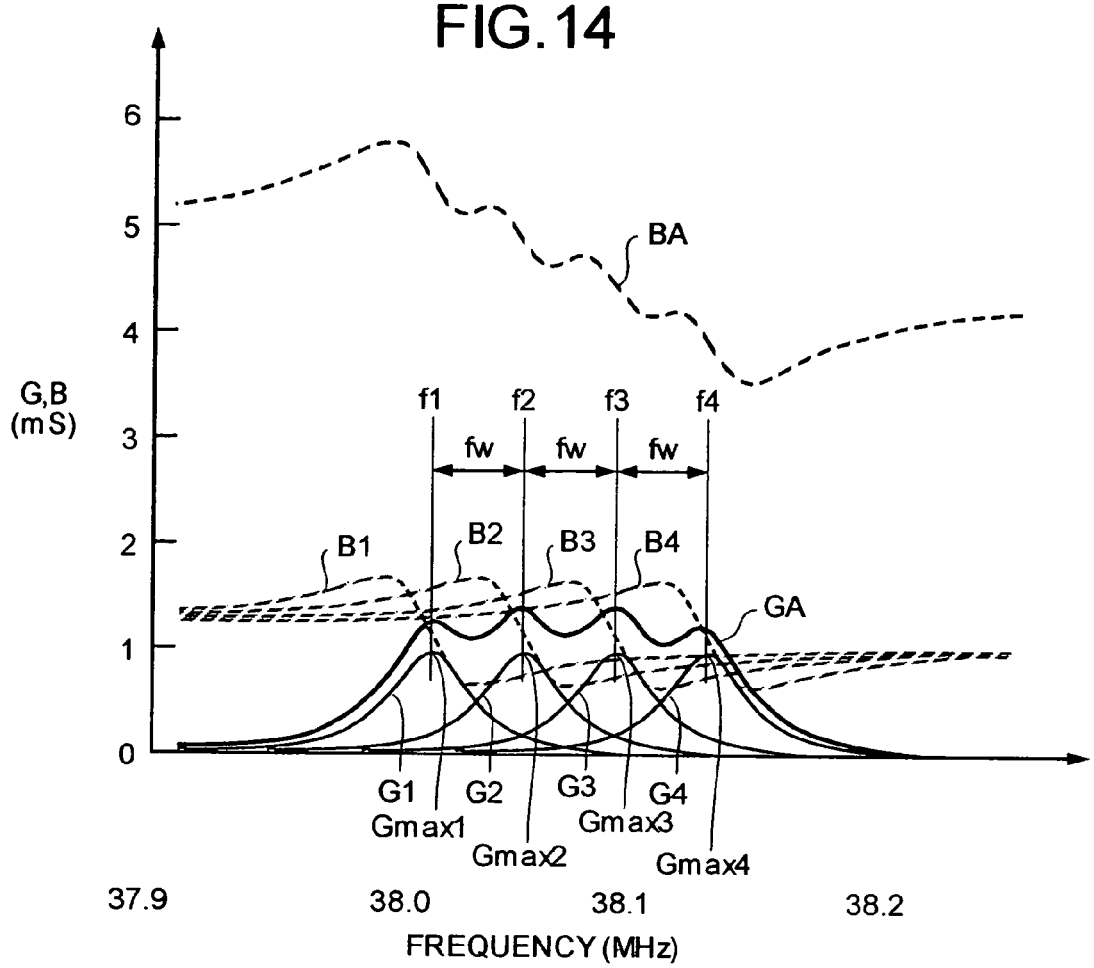
FIG. 14 is a graph of admittance characteristics illustrating each resonance status of a plurality of quartz crystal resonators X.

FIG. 13 is a flow chart of a procedure for calculating initial values of the equivalent circuit constants when there is a plurality of resonance points. FIG. 14 is a graphical representation of admittance characteristics illustrating each resonance status of a plurality of the quartz crystal resonators. The equivalent circuit is the same as that shown in FIG. 5. However, since the capacitors in parallel Cp1 to Cp4 can be combined into one capacitor, let the value (capacitance) of the combined capacitor be C. Parameters of individual quartz crystal resonator are express by suffices 1 to 4.

To start with, maximum values of frequencies f1 to f4 of the resonance points and maximum values Gmax1 to Gmax 4 of real part G (conductance) of admittance data at the frequencies f1 to f4 are determined (step S41). Further, Q factors Q1 to Q4 are calculated based on comparison of a maximum value of conductance at the resonance points which are measured in the atmosphere in advance and values of series resistances Rx1 to Rx4 (step S42). In this case, since the Q factor of resonance in the atmosphere is sufficiently big and since the resonance points are separated, the conductance G and the Q factor of the resonance points can be obtained separately (individually).

It is assumed here that the series resistance in the buffer solution is inversely proportional to a ratio of maximum conductance at a resonance point in atmosphere and maximum conductance at a resonance point in the buffer solution. The values of the series inductance Lx and the series capacitance Cx are assumed to have no change even when the quartz crystal resonator is exposed to the buffer solution. Practically, though the series inductance Lx and the series capacitance Cx are considered to be different in the atmosphere and in, the buffer solution, the values may have accuracy such that the values are not so high as initial values.

Further, an average value of an imaginary part (susceptance) BA in a specific frequency domain of the admittance characteristics is obtained and the parallel capacitance Cp is calculated (step S43). When the average value of susceptance is assumed to be B0, the parallel capacitance Cp can be calculated using equations (10) or (11):

$$\text{parallel capacitance } Cp=B0/(2\pi \cdot f) \quad (10)$$

$$Cp=(B\max+B\min)/(4\pi \cdot f) \quad (11).$$

In these equations, f is an average value of the resonance frequencies f1 to f4 and a domain that includes the four resonance points and is mainly around the four resonance points is selected as specific frequency domain. A domain that includes frequencies f1 to f4 in FIG. 4 is a specific frequency domain. When the equation (11) is to be used, it is necessary to know in advance the maximum and the minimum values of the imaginary part (susceptance).

The direct series inductance Lx and the direct capacitance Cx are calculated from the resonance frequencies F (f1 to f4), Rx (Rx1 to Rx4), and the Q factors (Q1 to Q4) in the buffer solution by using the following equations (12) and (13) (step S44). The equation (12) corresponds to the calculation at the resonance point f1 and similar equations can be prepared for the resonance points f2 and f3.

$$\text{series inductance } Lx1=Q1\cdot Rx1/(2\pi \cdot f1) \quad (12)$$

$$\text{series capacitance } Cx1=1/(2\pi \cdot f1 \cdot Q1 \cdot Rx1) \quad (13)$$

Thus, the initial values to be used in the method of least square can be obtained even when the sample is in the buffer solution. A characteristic curve of the admittance characteristics (such as resonance frequencies f1 to f4, real parts (conductance) G1 to G4 of admittance and imaginary parts (susceptance) B1 to B4 of admittance) related to the quartz crystal resonators X (X1 to X4) shown in FIG. 14 can be displayed upon calculation by the method of least squares on the display unit 3A of the information processor 3 (see FIG. 2).

According to the first embodiment, the resonance frequencies of the quartz crystal resonators X1, X2, . . . , XN are different. The resonance frequencies are set to a value such that there is a difference of not less than a fixed (certain) value upon considering the Q factor of the quartz crystal resonator in the buffer solution. For example, if the resonance frequency of the quartz crystal resonator is 38 MHz and the Q factor in the sample is approximately 1000, there is a difference of full with at half maximum of the resonance frequency i.e. a value derived by dividing the resonance frequency by the Q factor 38 MHz/1000=38 kilohertz (KHz). In this example, the resonance frequencies of the four quartz crystal resonators are 38.038 MHz, 38.076 MHz, 38.104 MHz, and 38.142 MHz.

Moreover, according to the first embodiment, if a difference fw between the resonance frequencies of the quartz crystal resonators is reduced, even a greater number of quartz crystal resonators can be measured at a time. If the difference between the resonance frequencies is reduced, in the admittance characteristics, resonance curves are overlapped and it becomes difficult to separate. The minimum value of the difference between the resonance frequencies fw differs depending on the method of calculation to obtain the resonance frequencies from the admittance characteristics and the changing width of the resonance frequencies. In general, a difference of a full width at half maximum facilitates separating. If the Q factors of the quartz crystal resonators differ from each other, the difference can be reduced even further as compared to a case of same value. Consequently, it is desirable to set the resonance frequencies by anticipating the amount of change in the resonance frequencies such that the difference between the resonance frequencies fw is greater than the minimum value after the change in the resonance frequencies.

Figure 15:
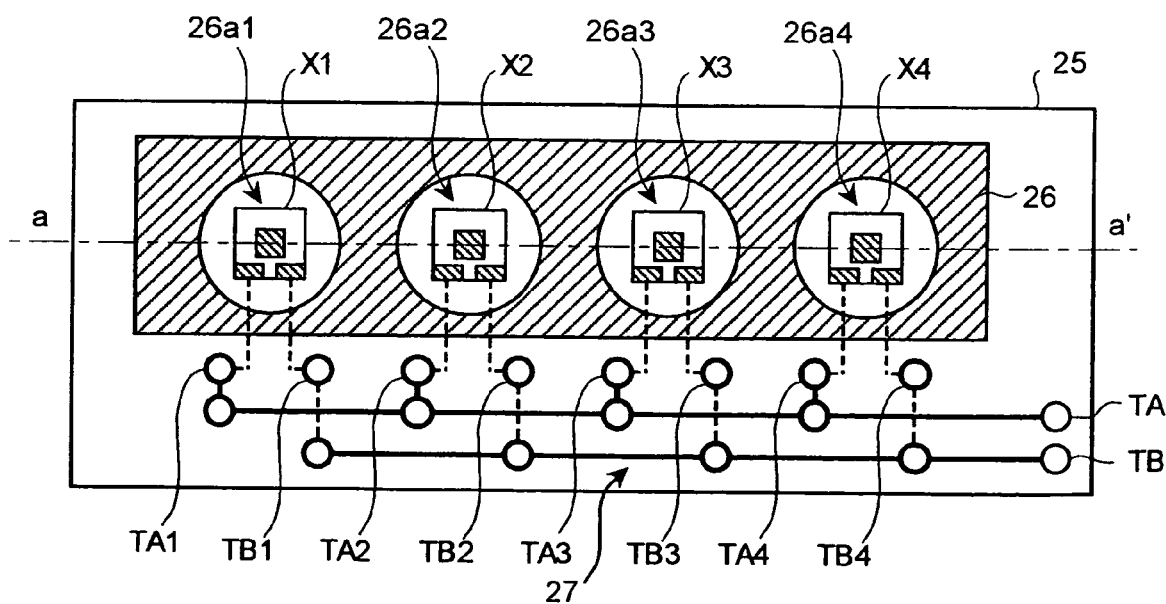
FIG. 15 is a top view of a configuration of a QCM sensor according to the first embodiment.
Figure 16:
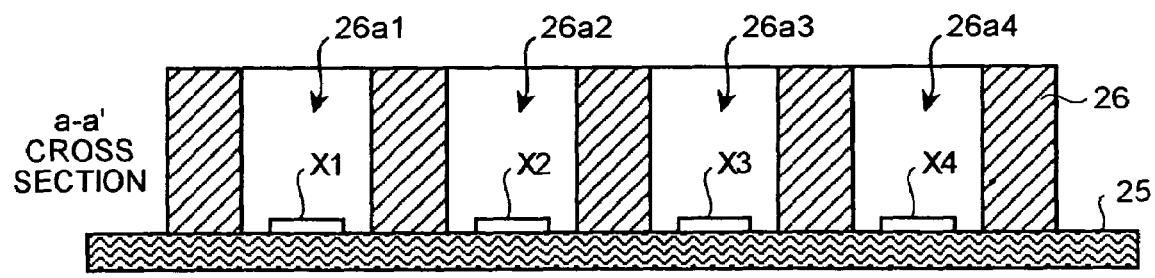
FIG. 16 is a cross sectional view taken along line a–a' shown in FIG. 15.

FIG. 15 is a top view of a configuration of the QCM sensor according to the first embodiment. FIG. 16 is cross sectional view taken along the line a–a' shown in FIG. 15. A block 26 of thickness 10 mm which is made of acrylic is stuck on a substrate 25 on which four quartz crystal resonators X1 to X4 are mounted. Four holes of diameter of about 6 mm are made as sample holders 26a1 to 26a4 in the block 26 matching with the positions of quartz crystal resonators X1 to X4 (oscillating domain). The sample holders 26a1 to 26a4 function as wells which hold the samples. The quartz crystal resonators X1 to X4 are disposed at bases of the sample holders 26a1 to 26a4. A substance to be detected which is included the samples (including the buffer solution) introduced in the sample holders 26a1 to 26a4 is detected by attaching (adsorbing) the to a sensing film (described in detail in the latter part) that is formed on surface electrodes of the quartz crystal resonators X1 to X4. As shown in FIG. 15, a metal wiring pattern is formed as a common line 27 on a surface of the substrate 25. The common line 27 is connected to connecting terminals TA and TB.

Figure 17:
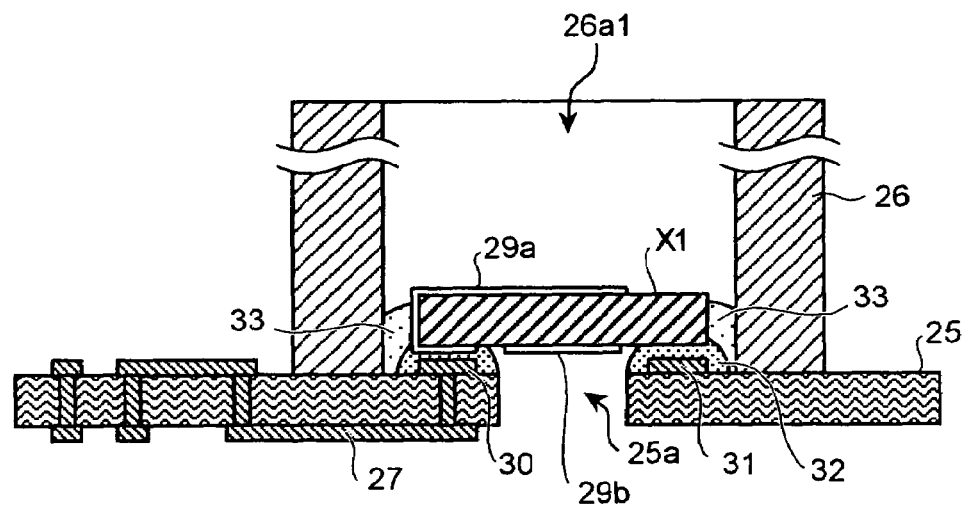
FIG. 17 is a side cross sectional view of an oscillating domain of one of the quartz crystal resonators.

FIG. 17 is a side cross sectional view of an oscillating domain of one of the quartz crystal resonators. The quartz crystal resonator X1 is fixed on pads 30 and 31 with a conductive adhesive 32 or an ACF (anisotropic conductive film), thereby having continuity. The pads 30 and 31 include metal wiring patterns. A rear electrode 29b of the quartz crystal resonator X1 faces the substrate 25. An air hole 25a is made on a part of the substrate 25 that is facing a rear electrode 29b of the quartz crystal resonator X1 so that a vibrating surface of the quartz crystal resonator does not come in contact with the substrate 25. The pad 30 is a connecting pad that connects a front electrode 29a and the rear electrode 29b of the quartz crystal resonator electrically. The pad 31 is a dummy pad for adjusting the height of the quartz crystal resonator. The front electrode 29a and the rear electrode 29b are disposed such that they do not make a contact with each other. The pad 30 is connected to the connecting terminals TA and TB through the common line (metal wiring pattern) 27. When the conductive adhesive 32 is used, it is necessary to insulate the sample electrically by sealing an area around the pads 30 and 31 by a sealing material like silicone resin 33. In FIG. 17, only one samples holder 26a1 (for quartz crystal resonator X1) is shown. The remaining sample holders for the quartz crystal resonators X2 to X4 have same structure.

Figure 18:
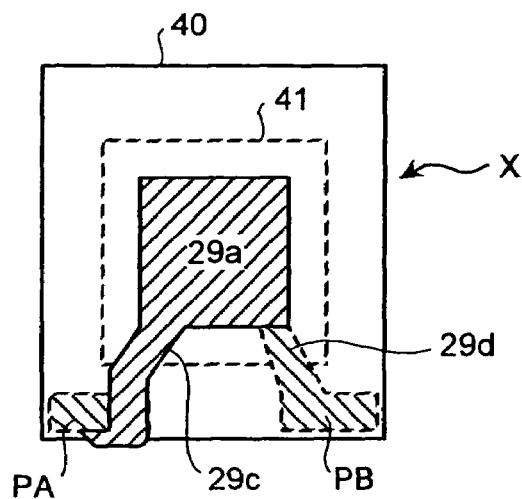
FIG. 18 is a view of a front surface (in contact with a solution) of the quartz crystal resonator.
Figure 19:
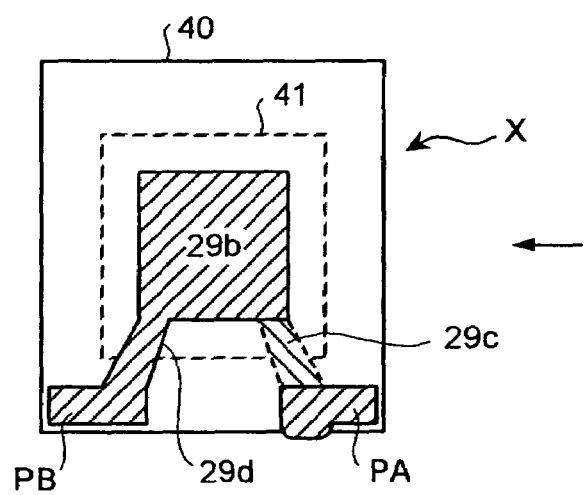
FIG. 19 is a view of a rear surface of the quartz crystal resonator.
Figure 20:
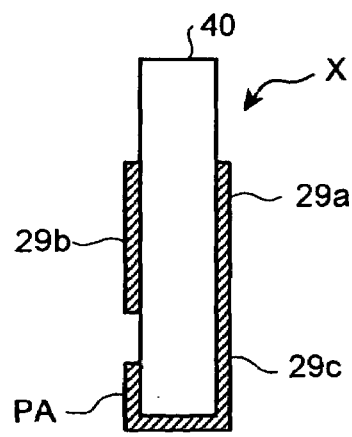
FIG. 20 is a view of a side surface of the quartz crystal resonator.

FIG. 18 is a view of a front surface (in contact with a solution) of the quartz crystal resonator. FIG. 19 is a view of a rear surface of the quartz crystal resonator. FIG. 20 is a view of a side surface of the quartz crystal resonator as seen from a side shown by an arrow in FIG. 19. The quartz crystal resonator X includes a front electrode 29a and a rear electrode 29b which are formed on a front surface of a quartz substrate 40. The front electrode 29a is connected to a connecting pad PA on a rear surface through a diagonal leading line 29c. The rear electrode 29b is connected to a connecting pad PB on a front surface of through a diagonal leading line 29d. The connecting pads PA and PB are connected to the pad 30 shown in FIG. 17. The rear electrode 29b is not extended up to the front surface. In other words, the quartz crystal resonator is structured such that only the front electrode 29a comes in contact with the sample. Thus, shorting (short-circuit) of the front electrode 29a and the rear electrode 29b due to a solution that includes the sample is prevented. An area covered by dotted line 41 in FIGS. 18 and 19 is an area that is stuck to the substrate 25 (see FIG. 17). An area outside the dotted line 41 is an area that is stuck to the substrate 25.

A second embodiment of the present invention is described below. The second embodiment differs from the first embodiment in that in the second embodiment the quartz crystal resonators X1 to X4 have almost same resonance frequency. For example, in a four channel QCM sensor device, the resonance frequency of each of the four quartz crystal resonators X1 to X4 is around 38.000 MHz.

Figure 21:
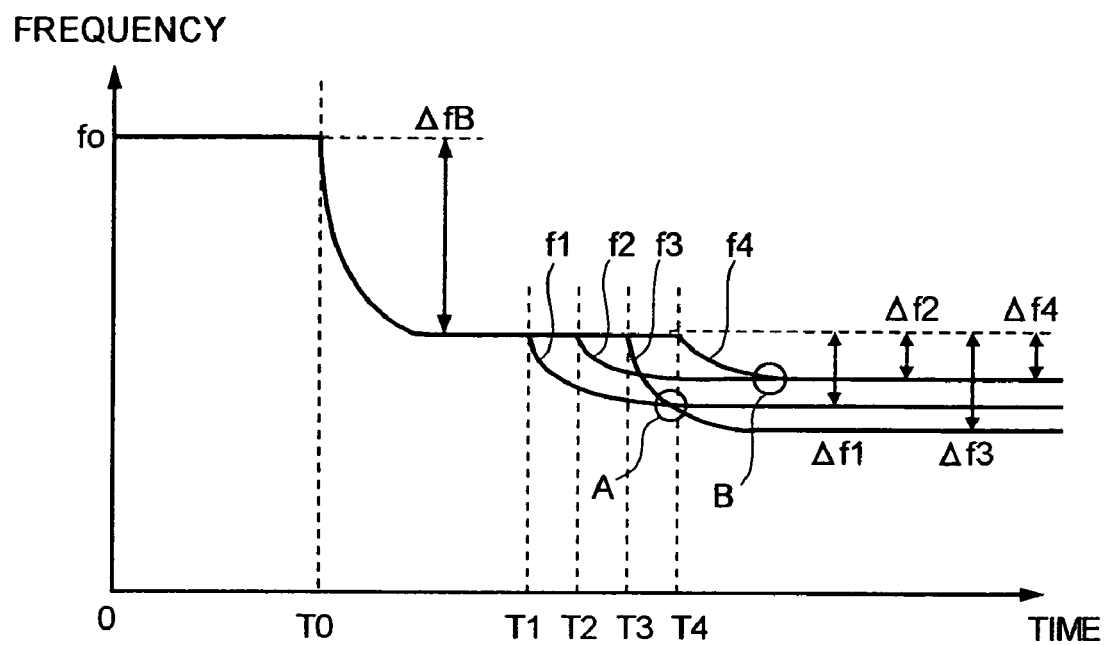
FIG. 21 is a time chart of a change in the resonance frequency when measured by using a plurality of the quartz crystal resonators in which the resonance frequencies in a second embodiment of the present invention are matched.

FIG. 21 is a time chart of a change in the resonance frequency when measured by using the quartz crystal resonators according to the second embodiment. Time is plotted on the horizontal axis and frequency is plotted on the vertical axis. When the resonance frequency fo of each of the quartz crystal resonators X1 to X4 is same, as the time elapses, the number of resonance points changes as shown in FIG. 21. A buffer solution is introduced at time T0 in four wells (sample holders 26a1 to 26a4) shown in FIGS. 15 and 16 and the resonance frequency of the four quartz crystal resonators X1 to X4 is allowed to be stabilized. In this case, a change in the resonance frequency is ΔfB. When the sample is charged upon stabilizing of the resonance frequency, there are two resonance points during a period of time from T1 to T2 and three resonance points during a period of time from T2 to T3. Therefore, a method has to be devised for the measurement of the resonance frequency.

Since the resonance frequencies are matched, resonance cannot be separated. However, it is not necessary to separate since the resonance frequencies match from the beginning. Upon stabilizing of the resonance frequencies at time T0 shown in FIG. 21, when a sample solution that contains the sample to be measured is introduced in the sample holder 26a1, there is a change in resonance frequency f1 of the quartz crystal resonator. If the resonance frequency f1 changes from fo, from a view point of admittance characteristics, it can be separated into two resonances and the change in the resonance frequency f1 can be measured. Further, as different sample solutions are introduced one after the other in the sample holders 26a2 to 26a4 at time T2 to T4, the resonance can be separated every time the sample solution in introduced and the change in the resonance frequencies corresponding to the quartz crystal resonators X1 to X4 can be measured.

By adding the samples drop wise for different periods of time, it becomes clear as to which quartz crystal resonator among the quartz crystal resonators X1 to X4, the resonance frequencies f1 to f4 correspond. The resonance frequency measuring unit (information processor 3) performs calculation to convert the change in resonance frequencies to mass change from the amounts of change Δf1 to Δf4 in the resonance frequencies by using mass sensitivity that is calculated in advance.

As shown at a point A in FIG. 21, even if the resonance frequencies f1 and f3 cross each other, although the two resonances can not be separated near the cross section, the resonances can be separated before or after that (before and after the intersection) and the crossing of the two resonance frequencies can be identified easily by having a look at a change in the overall resonance frequencies. Moreover, as shown at a point B in FIG. 21, when the resonance frequencies f2 and f4 match, the resonance points cannot be separated. However, since the resonance frequencies are matching right from the beginning, there is no need to separate and changes in the frequency Δf2 and Δf4 of the quartz crystal resonators X2 and X4 are equivalent. Thus, even in the resonance frequencies of a plurality of quartz crystal resonators are matched, a change in the resonance frequency of each of the quartz crystal resonator can be measured.

Figure 22:
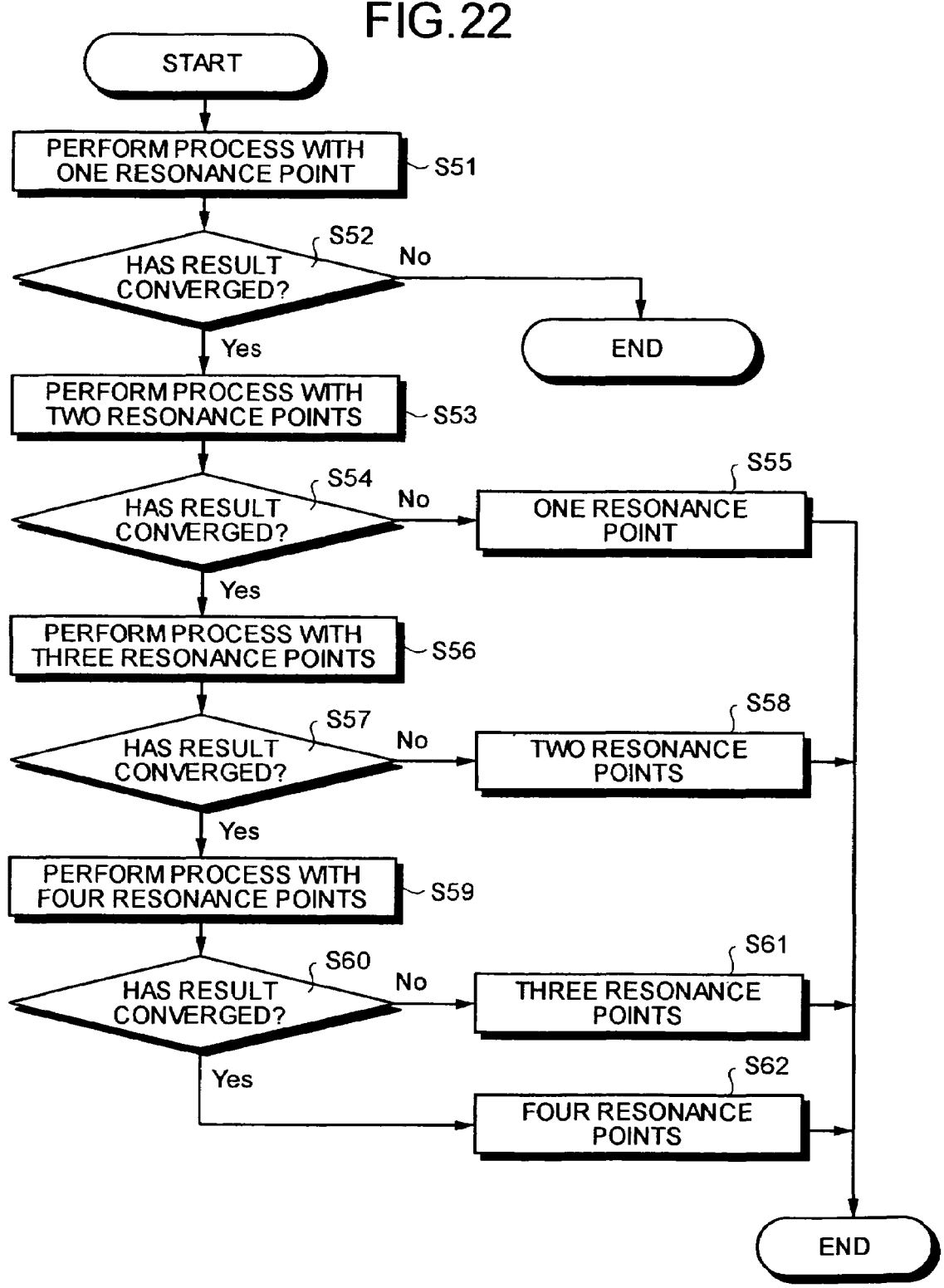
FIG. 22 is a flow chart of a process procedure for measuring by using a plurality of quartz crystal resonators having same resonance frequencies.

FIG. 22 is a flow chart of a process procedure for measuring by using a plurality of quartz crystal resonators having resonance frequencies. A procedure for measurement when the number of resonance-points changes with time elapsed is illustrated in FIG. 22 and is equivalent to a process of using the method of least squares in steps S13 and S14 of procedure for measurement in FIG. 10.

In the process procedure in FIG. 22, an attempt is made to calculate by using the method of list squares while changing the number of resonance points and the one for which the number of resonance points is maximum is used. To start with, calculation process by using the method of least squares with one resonance point is performed (step S51). Further, a judgment of whether values of the results obtained are converged or not is made (step S52). If the values are not converged upon performing the process with one resonance point ("No" at step S52), the process ends abnormally. If the values are converged ("Yes" at step S52), the process by the method of least squares with two resonance points is performed (step S53).

If the values are not converged after the process performed for second time with two resonance points ("No" at step S54), a judgment of one resonance point is made (step S55) and the process is ended by using the result obtained as resonance frequency at step 51. If the values are converged ("Yes" at step S54) by the process performed for the second time (step S53), the process is repeated similarly while increasing the resonance point by one every time like three resonance points, then four resonance points etc. (step S56 to step S59). When the process is performed with four resonance points (step S59) and if the values are converged ("Yes" at step S60), without increasing the number of resonance point above four, the process is ended by using the result obtained as resonance frequency at step 59.

For processes at steps S51, S53, S56, and S59 to obtain the resonance frequency by calculation using the method of least squares, a method described in FIG. 11 can be used. However, it is necessary to devise a method for acquisition of the initial values which are used for calculation by the method least squares. For obtaining initial values for the process with one resonance points, the procedure described by referring to FIG. 12 can be used. However, by using the procedure described by referring to FIG. 13, the initial values for the process with more than two resonance points cannot be obtained.

This is because, the method for calculation of the initial values described by referring to FIG. 13 is for a case where the resonance frequency in the atmosphere is separately distinctly in advance. However, according to the second embodiment, the resonance frequencies of the quartz crystal resonators X1 to X4 match with each other. In such a case, the initial value of the resonance frequency is obtained by the following method.

Although the maximum values of the four resonance frequencies in the admittance characteristics seem to be almost overlapping with each other, positions of the four resonance points are slightly shifted (not exactly the same) in reality. Therefore, the resonance frequency fitted (subjected to fitting) by the method of least squares with one resonance point is let to be fo and a frequency with a slight shift from fo can be used. A method in which the values are converged by employing the method of least squares after selecting the frequency with a slight shift where the quantity of slight shift is from a few Hz to a few KHz may be used.

Or a method in which a difference between a full width at half maximum obtained by the method of least squares with one resonance point and a full width at half maximum obtained from measured values of admittance characteristic is considered to be about the same as the shift in the resonance frequencies, can be used. If the full width at half maximum is fwd, the resonance frequency is f, the Q factor is Q, the full width at half maximum can be calculated by fwd=f/Q. By using this procedure, the resonance frequencies when the number of resonance-points change with time elapsed can be measured.

According to the second embodiment, the accuracy of measurement of the resonance frequency depends on a capability to separate resonance. It is possible to improve the accuracy easily by devising a method of calculation for obtaining the equivalent circuit constants of the quartz crystal resonator from the admittance characteristics. According to the second embodiment, since the same resonance frequency for the quartz crystal resonator can be used, there is no need to arrange quartz crystal resonators of different resonance frequencies and the cost is reduced. Moreover, when a process for adjustment of resonance is omitted in a manufacturing process of the quartz crystal resonators, there is going to be variation in the resonance frequency of each quartz crystal resonator. However, even if there is variation in the resonance frequencies, since the resonance frequencies can be separated in a range of measurement accuracy, the measurement accuracy can be applied in a tolerable range. In this case, the process for adjustment of resonance is not required and the cost is reduced to a great extent.

Figure 23:
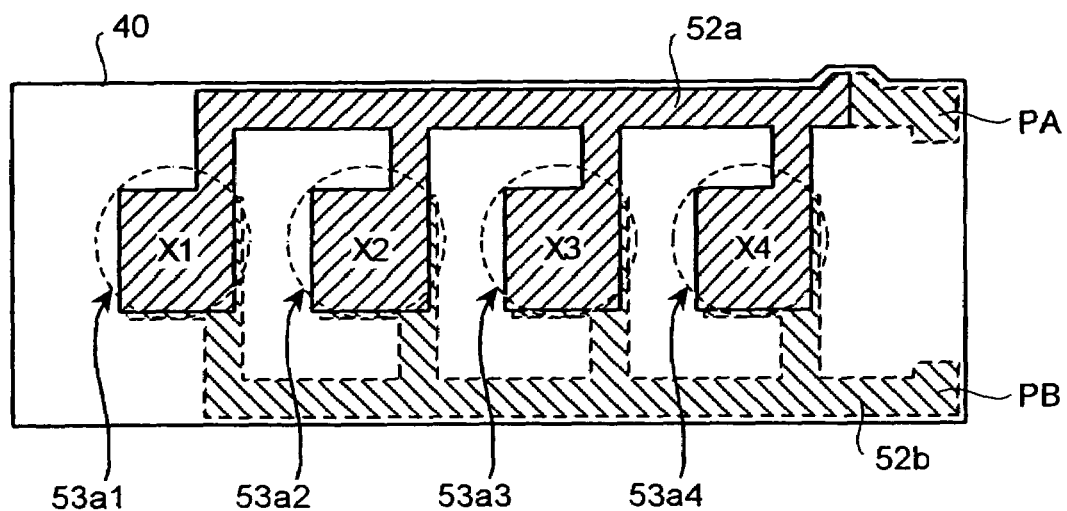
FIG. 23 is a top view of a QCM sensor according to a third embodiment of the present invention.
Figure 24:
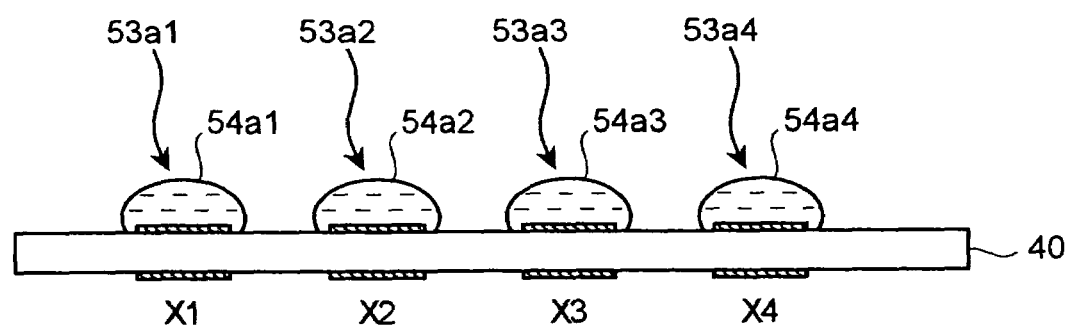
FIG. 24 is side view of the QCM sensor shown in FIG. 23.

A third embodiment of the present invention is described below. The third embodiment differs from the first and the second embodiments in the configuration of the QCM sensor 1. FIG. 23 is a top view of a QCM sensor according to the third embodiment. FIG. 24 is a side view of the QCM sensor shown in FIG. 23. According to the third embodiment, four oscillating domains 53a1 to 53a4 are provided on a quartz substrate 40. Electrodes to drive each of the oscillating domains 53a1 to 53a4 are provided on a front surface and a rear surface of resonators, thereby forming four quartz crystal resonators X1 to X4 on the substrate 40.

Front electrodes and rear electrodes of the quartz crystal resonators X1 to X4 are connected collectively (in parallel) by common lines 52a and 52b on the quartz substrate 40 and are led out to connecting terminals (connecting pads) PA and PB. The sample need not be necessarily held in the sample holders 26a1 to 26a4 shown in FIGS. 15 and 16. For example, samples 54a1 to 54a4 applied drop wise on the quartz crystal resonators X1 to X4 as shown in FIG. 24 can be held by using surface tension of the quartz substrate 40. In this case, water-repellent process of a surface of the quartz substrate 40 is performed deliberately to hold the sample more reliably.

Although the quartz crystal resonators X1 to X4 according to the third embodiment are disposed in a straight line, they can also be disposed in a matrix form. Moreover, sensing film that is formed on the surface of the electrodes of the quartz crystal resonator X can be the same for all or sensing films that adsorb different object particles can be formed.

According to the first, the second, and the third embodiments, the connecting terminals are formed by commonly connecting the electrodes of the quartz crystal resonators collectively on the side of the QCM sensor. However, the present invention is not limited to commonly connecting the electrodes collectively on the side of the sensor and the electrodes may be connected commonly and collectively on the side of the resonance-frequency measuring circuit.

A fourth embodiment of the present invention is described below. According to the fourth embodiment, one of a plurality of quartz crystal resonators (two quartz control resonators) X1 and X2 is used for a reference measurement. Resonance frequency of the quartz crystal resonator X described earlier changes not only due to a mass adsorbed (attached) on the electrodes of the quartz control resonator, but also due to temperature of the quartz crystal resonator, temperature of the solution, viscosity of the solution etc. Therefore, there are frequency fluctuations like noise and drift in the measurement result of the resonance frequency quite often. To get rid of these fluctuations, it is necessary to devise a way by maintaining constant the temperature of the solution that contains a sample solution and the temperature of the quartz crystal resonator X etc.

It is difficult to maintain the temperature of the solution and the quartz crystal resonator X perfectly constant. Among causes other than the temperature, are temperature dependency of an oscillating circuit for measuring the resonance frequency, fluctuation in amplitude of oscillation with decrease in Q factor in the solution, effect of electromagnetic noise, fluctuation in load on the oscillating circuit due to increase and decrease in the amount of solution etc. It is extremely difficult to overcome all these causes completely.

If the quartz crystal resonator X that measures a substance to be measured (hereinafter, "target resonator") and the resonator that is used as reference (hereinafter, "reference resonator") are two different resonators, since the frequency fluctuation received by the two resonators is also different, in most of the cases it is not possible to overcome effect of the frequency fluctuation completely. Moreover, to measure the resonance frequencies of the two resonators, oscillations are caused by using separate quartz oscillating circuits. Oscillating frequencies are measured by a frequency counter, and the measured frequencies are considered as resonance frequencies. In this method, it is difficult to overcome causes of fluctuation based on (due to) difference in characteristics of separate oscillating circuits.

It is a widely used practice to stir a solution by an electromagnetic stirrer to speed the reaction between the substance to be measured and the sensing film. Since the electromagnetic stirrer rotates a piece of magnet by using a rotating magnetic field, there is an electromagnetic noise. The rotating magnetic field causes electromagnetic induction in the wiring of the target resonator and the wiring of the reference resonator. A change in the magnetic flux varies depending on how the wiring is done. Therefore, the frequency fluctuation is different. Same is the case for the noise of the electromagnetic field from outside.

Figure 25:
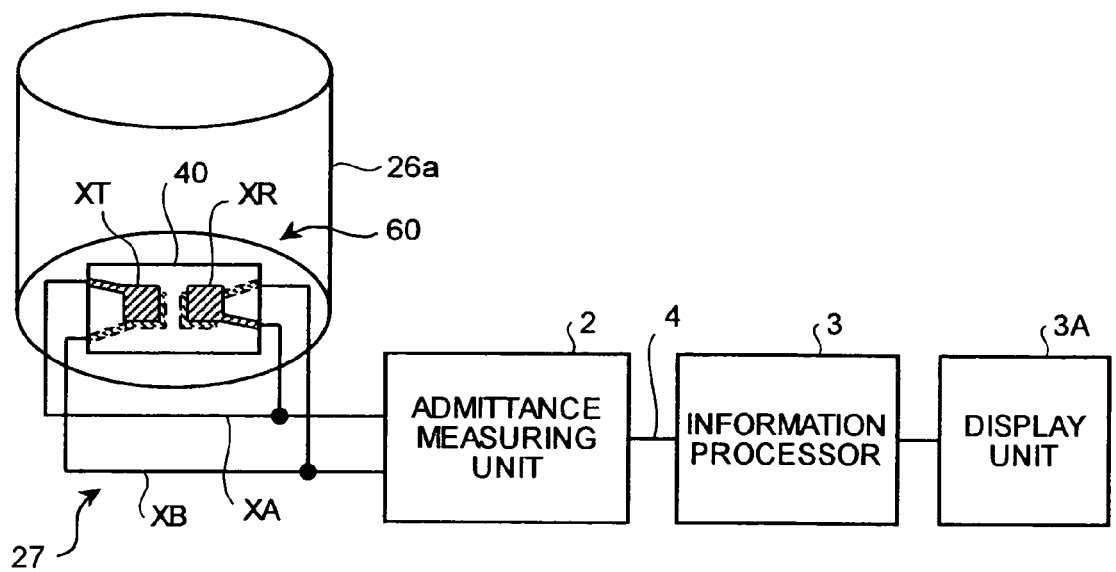
FIG. 25 is a QCM sensor device according to a fourth embodiment.

FIG. 25 is a QCM sensor device according to the fourth embodiment. A QCM sensor (quartz crystal resonator) 60 shown in FIG. 25 includes two (2 ch) oscillating domains formed on a single quartz substrate 40. In this example, one of the oscillating domains is used as reference.

In FIG. 25, XT denotes a target resonator (of a type that adsorbs a substance to be measured) for detecting a substance to be measured, XR denotes a reference resonator. One sample holder (well) 26a is provided for a pair of the target resonator XT and the reference resonator XR. Electrodes of the target resonator XT and the reference resonator XR are connected in parallel to lines XA and XB in a common line 27 and further connected to an admittance measuring unit 2. Similar to the descriptions in the earlier embodiments, the admittance measuring unit 2 measures admittance characteristics of the target resonator XT and the reference resonator XR and transmits admittance data 4 to the information processor. In the information processor 3, the target resonator XT and the reference resonator XR are regarded as resonance circuits which includes a plurality of resonance circuits each and equivalent circuit constants of the resonance circuits are calculated by using the method of least squares. From the equivalent circuit constants of the resonance circuits, equivalent circuit constants of the quartz crystal resonator like resonance frequency, Q factor etc. are calculated and displayed on the display unit 3A.

Figure 26:
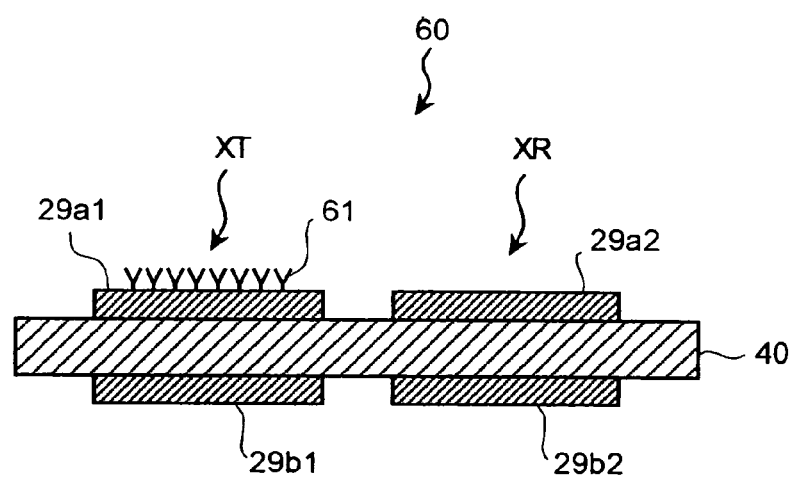
FIG. 26 is a side cross sectional view of the QCM sensor according to the fourth embodiment.

FIG. 26 is a side cross sectional view of the QCM sensor according to the fourth embodiment. A sensing film 61 that combines specifically with a substance to be measured is applied on a front electrode 29a1 of the target resonator XT. Whereas, the reference resonator XR is without the sensing film 61 applied on it. The information processor 3 can extract only a change in the frequency based on a mass combined (attached (adsorbed)) with the sensing film 61 by calculating a difference of change in the resonance frequencies of the target resonator XT and the reference resonator XR.

Figure 27:
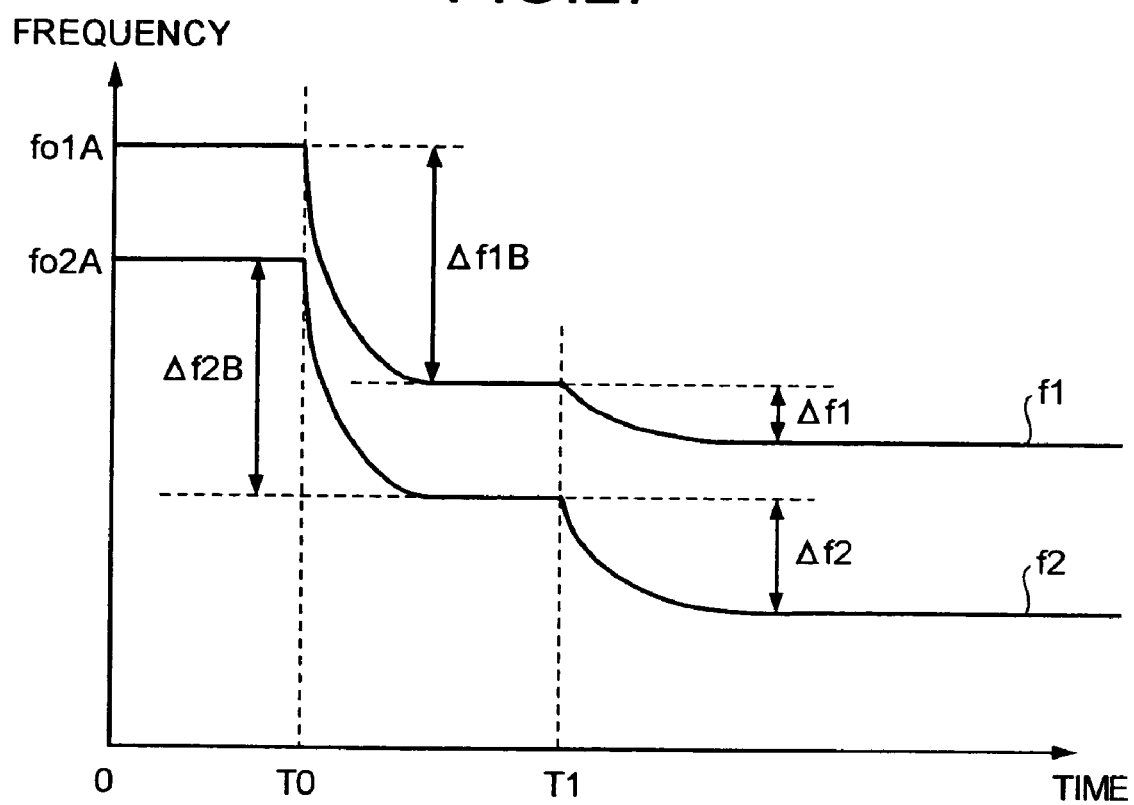
FIG. 27 is a time chart of a change in the resonance frequency when the resonance frequency is measured by using a quartz crystal resonator according to the fourth embodiment.

FIG. 27 is a time chart of a change in the resonance frequency when the resonance frequency is measured by using the quartz crystal resonator according to the fourth embodiment. A horizontal axis indicates time and a vertical axis indicates frequency. Frequency of about 38 MHz is used for the quartz crystal resonator X (the target resonator XT and the reference resonator XR).

During a period (from time 0 to T0) in the atmosphere, all maximum values of resonance frequencies are sharp and separated distinctly into two. Resonance frequency of the reference resonator XR is foA1 and that of the target resonator XT is fo2A.

When a buffer solution is added to the sample holder (well) 26a at time T0, the frequencies of the quartz crystal resonators X (XR and XT) are reduced by about 20 KHz. An amount of change in the frequency of the reference resonator XR is Δf1B and that in the frequency of the target resonator XT is Δf2B.

Further, when a solution containing a sample is added to the buffer solution at time T1, there is a big change (amount of change Δf2) in resonance frequency f2 of the target resonator XT and resonance frequency of the reference resonator XR changes by a very small amount (Δf1). This change is considered to be due to a change in the temperature and a change in viscosity of the buffer solution due to addition of the solution containing the sample.

Therefore, the information processor 3 performs correction by using the amount of change Δf2 in the resonance frequency f2 of the target resonator XT and the amount of change Δf1 in the resonance frequency f1 of the reference resonator XR. In other words, by calculating the difference in the amounts of change Δf2−Δf1, a change in the resonance frequency due to a change in mass attached (adsorbed) to the target resonator XT can be calculated easily and precisely.

Thus, according to the fourth embodiment, the target resonator XT and the reference resonator XR are formed on the same quartz substrate. The target resonator XT and the reference resonator XR are connected commonly to the oscillating circuit in the admittance measuring unit by the common line 27. The mass can be measured precisely by calculating the difference between the two resonance frequencies obtained. The quartz crystal resonators X (XT and XR) are driven by using a single oscillating circuit in the admittance measuring unit 2 and the two quartz crystal resonators XT and XR are driven via the common line 27.

Therefore, the fluctuations caused when the quartz crystal resonators are made to oscillate by a plurality of quartz oscillating circuits or the fluctuations caused due to switching of different wiring paths and different wiring circuits, can be prevented.

Figure 28:
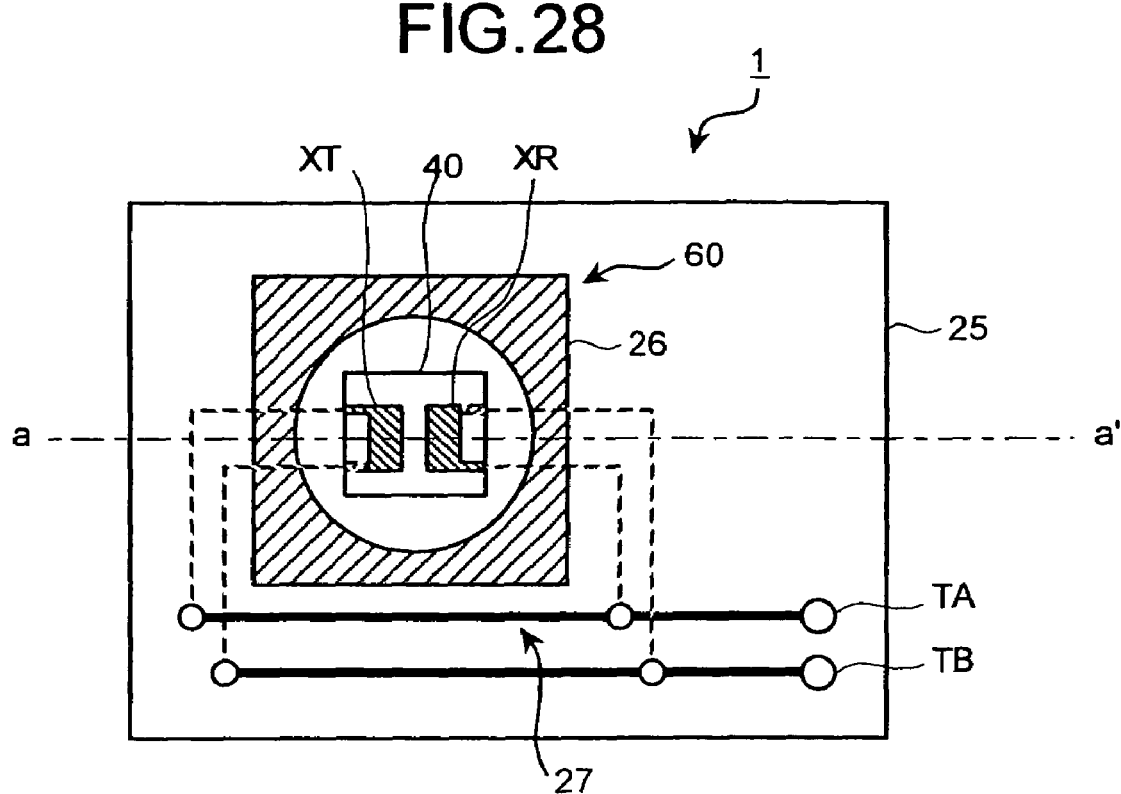
FIG. 28 is a top view of a QCM sensor according to the fourth embodiment.
Figure 29:
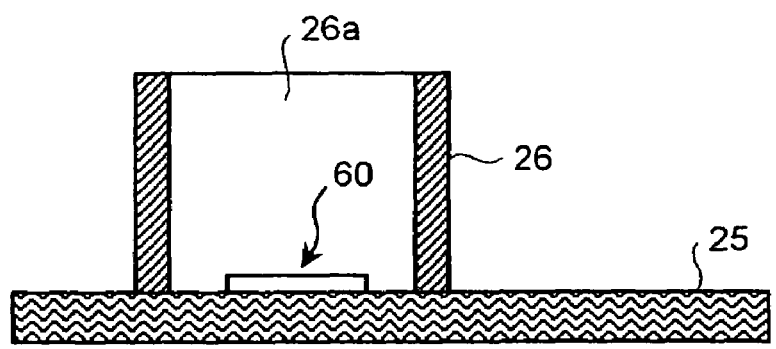
FIG. 29 is a cross sectional view taken along line a–a' shown in FIG. 28.

FIG. 28 is a top view of the QCM sensor according to the fourth embodiment and FIG. 29 is a cross sectional view taken along line a–a' shown in FIG. 28. The pair of the quartz crystal resonators X i.e. the target quartz crystal resonator XT and the reference quartz crystal resonator X are mounted on a substrate 25. A block 26 made of acrylic having thickness 10 mm is stuck on the substrate 25. The block 26 includes a sample holder (well) 26a such that the pair of the quartz crystal resonators X (XR and XT) are accommodated in the sample holder (well) 26a. The pair of the quartz crystal resonators X (XR and XT) detects a substance to be detected which is included in a sample (that includes a buffer solution) that is introduced in the sample holder 26a. As shown in FIG. 28, a metal line pattern is formed on a surface of the substrate 25 as common line 27 and is connected to connecting terminals TA and TB.

Figure 30:
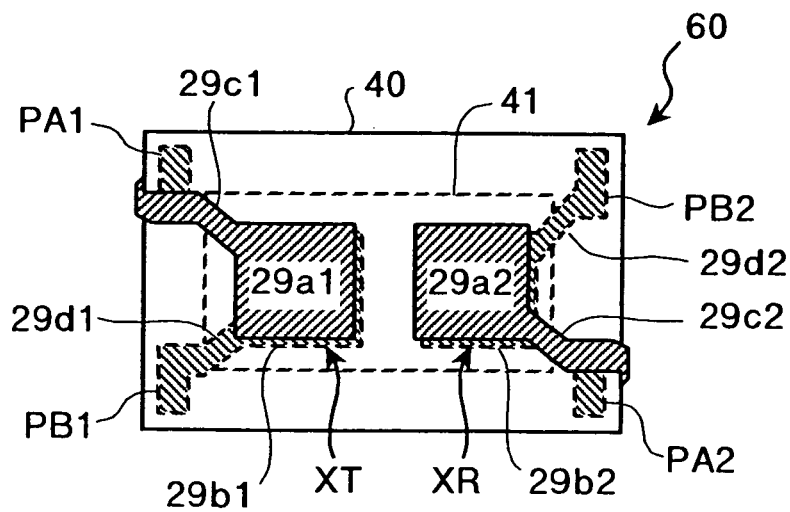
FIG. 30 is a top view of the quartz crystal resonator according to the fourth embodiment.

FIG. 30 is a top view of the quartz crystal resonator according to the fourth embodiment. A quartz crystal resonator 60 includes a pair of a target resonator XT and a reference resonator XR which are formed on a single quartz substrate 40. A front electrode 29a1 of the target resonator XT and a front electrode 29a2 of the reference resonator XR are formed on a front surface of the quartz substrate 40. A rear electrode 29b1 of the target resonator XT and a rear electrode 29b2 of the reference resonator XT are formed on a rear surface of the quartz substrate 40.

The front electrodes 29a1 and 29a2 are connected to connecting pads PA1 and PA2 on the rear side by diagonal leading lines 29c1 and 29c2 respectively. The rear electrodes 29b1 and 29b2 are connected to connecting pads PB1 and PB2 on the rear side by diagonal leading lines 29d1 and 29d2 respectively. An area covered by a dotted line 41 in FIG. 30 is an area that is stuck to the substrate 25 shown in FIG. 17 and an area outside the dotted line 41 is an area that is stuck to the substrate 25.

Figure 31:
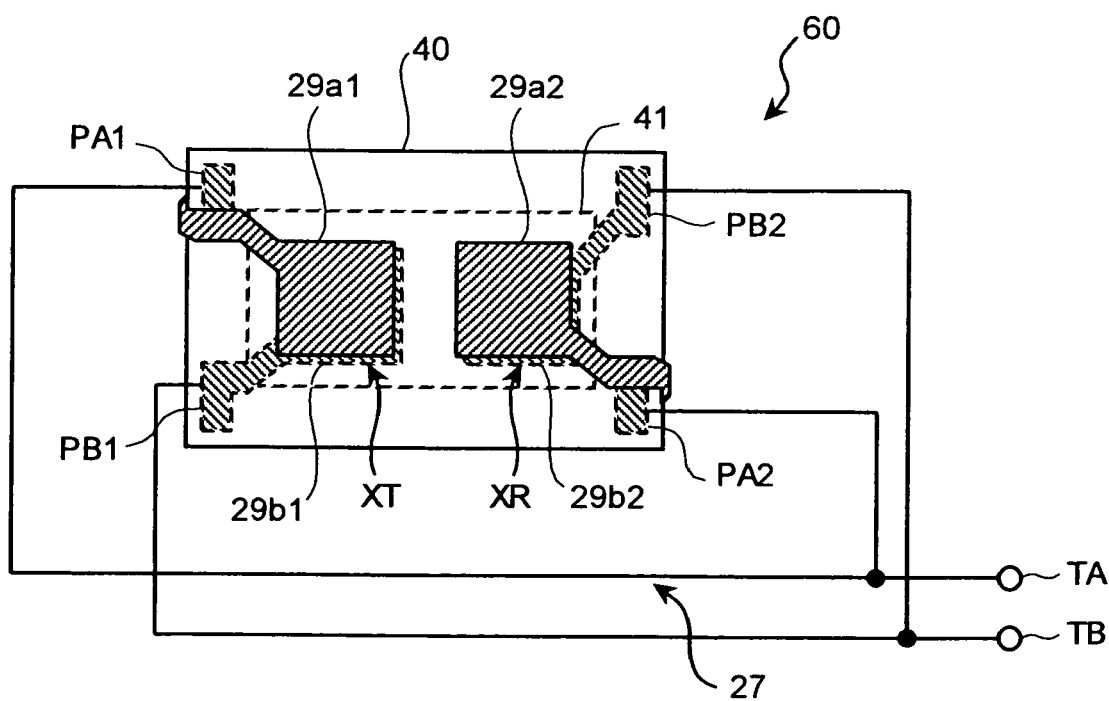
FIG. 31 is a wiring diagram of the quartz crystal resonator shown in FIG. 30.

FIG. 31 is a wiring diagram of the quartz crystal resonator shown in FIG. 30. As shown in FIG. 31, a common line 27 connects the connecting pads PA1 and PA2 of the front electrodes 29a1 and 29a2 commonly and leads to a connecting terminal TA and connects the connecting pads PB1 and PB2 of the rear electrodes 29b1 and 29b2 commonly and leads to a connecting terminal TB.

Figure 32:
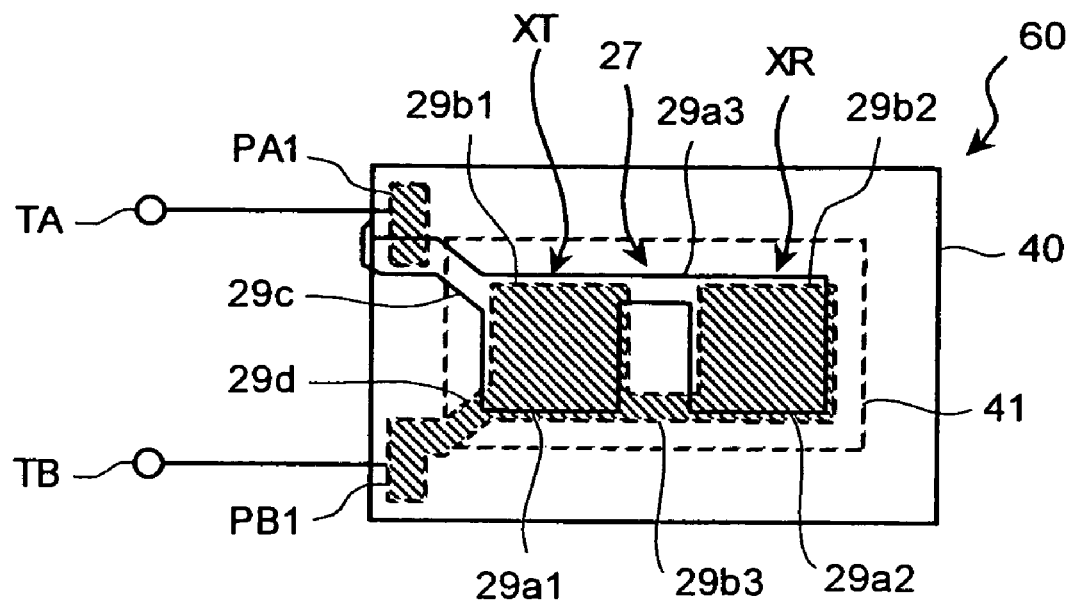
FIG. 32 is another example of structure of the quartz crystal resonator according to the fourth embodiment.

FIG. 32 is another example of the structure of the quartz crystal resonator according to the fourth embodiment. In this example, a function of a common line performed by a common line 27 is formed on the quartz substrate 40. A front electrode 29a1 of the target resonator XT and a front electrode 29a2 of the reference resonator XR are connected by a connecting section 29a3 which is formed by an electrode film same as that of the electrodes 29a1 and 29a2. Similarly, a rear electrode 29b1 of the target resonator XT and a rear electrode 29b2 of the reference resonator XR are connected by a connecting section 29b3 which is formed by an electrode film same as that of the electrodes 29b1 and 29b2.

Further, the front electrodes 29a1 and 29a2 are connected to the connecting pad PA1 on the rear surface by a leading line 29c. The rear electrodes 29b1 and 29b2 are connected to the connecting pad PB1 on the rear surface by a diagonal leading line 29d. With such structure, there is no nee to have a wiring in a position outside the quartz substrate 40. The connecting sections 29a3 and 29b3 are disposed in different positions sandwiching the quartz substrate 40 and the quartz substrate does not resonate. It is desirable to form the connecting sections 29a3 and 29b3 such that the two are separated as much as possible from each other. For example, the connecting section 29a3 and 29b3 may be formed in the shape of circular arcs going away from each other.

Figure 33:
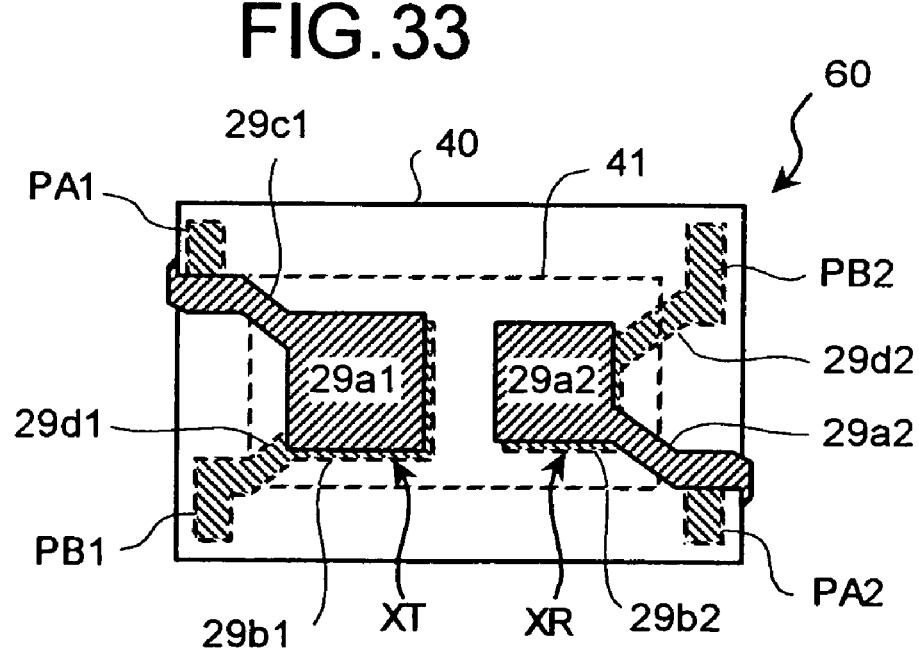
FIG. 33 is still another example of structure of the quartz crystal resonator according to the fourth embodiment.

FIG. 33 is still another example of the structure of the quartz crystal resonator according to the fourth embodiment. The structure shown in FIG. 33 is almost similar to that of the quartz crystal resonator 60 described by referring to FIG. 30. In the structure in FIG. 33, the target resonator XT and the reference resonator XR have different areas. Concretely, the front electrode 29a1 and the rear electrode 29b1 of the target resonator XT are formed such that they have larger area than that of the front electrode 29a2 and the rear electrode 29b2 of the reference resonator XR. Normally, the resonance frequency of the quartz crystal resonator increases when the area of electrode decreases. By having different areas of the target resonator XT and the reference electrode XR, the resonance frequencies of the target electrode XT and the reference electrode XR differ. Without limiting the structure mentioned here, the target electrode XT can be designed to have small area than that of the reference electrode XR.

In FIGS. 23, 30, 31, 32, and 33, the front electrode side and the rear electrode side are shown to be shifted for the sake of convenience. However, the front electrode side and the rear electrode side are formed in same positions on two sides of the quartz substrate 40 such that the quartz substrate 40 is sandwiched between the two.

According to the present invention, it is possible to obtain resonance frequencies of a plurality of resonators from admittance characteristics obtained by one sweep (sweeping once) in admittance measuring unit without increasing the number of wires connecting a piezoelectric transducer and the admittance measuring unit and without using a switching circuit to switch the piezoelectric transducer. Therefore, it is possible to realize a multi-channel QCM sensor device with the same system configuration and the same cost as that of a one-channel QCM sensor device. It is possible to obtain not only a change in the resonance frequency but also a change in the Q factor that affects a change in the viscosity of a sample solution simultaneously.

According to a QCM sensor in the present embodiment, without increasing the number of wires which connect a plurality of piezoelectric transducers and resonance-frequency measuring unit, the number of wires connecting with the external equipment can be reduced and the QCM sensor can be easily made to be a multi-channel sensor. Moreover, the number of wires connecting the QCM sensor with the resonance-frequency measuring unit can be reduced, the multi-channeling can be achieved even with less number of wires, and a precise measurement can be done.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A QCM (quartz crystal microbalance) sensor that detects an amount of a substance, comprising:
    a plurality of piezoelectric transducers, each piezoelectric transducer having a pair of electrodes including a first electrode and a second electrode, having respective resonance frequencies, and being adapted to adsorb said substance and change said resonance frequency;

a pair of connecting lines including a first connecting line that is commonly connected to each of the first electrodes of the piezoelectric transducers and a second connecting line that is commonly connected to each of the second electrodes of the piezoelectric transducers; and a pair of terminals including a first terminal that is connected to the first connecting line and a second terminal that is connected to the second connecting line.

2. The QCM sensor according to claim 1, each of the piezoelectric transducers having a pair of surfaces including a front surface and a rear surface, wherein the first electrodes are disposed on the front surface and the second electrodes are disposed on the rear surface.

3. The QCM sensor according to claim 1, wherein the pair of electrodes of piezoelectric transducers are connected to the pair of connecting lines in such a manner that the piezoelectric transducers are connected in parallel to each other.

4. The QCM sensor according to claim 1, each of the piezoelectric transducers having a pair of surfaces including a front surface and a rear surface, wherein the first electrodes are disposed on the front surface and the second electrodes are disposed on the rear surface, and the quartz crystal microbalance sensor further comprises a plurality of leading wires, each leading wire leading from the front surface to the rear surface.

5. The QCM sensor according to claim 1, further comprising a substrate, wherein each of a plurality of said electrode pairs forms an oscillating domain on the substrate.

6. The QCM sensor according to claim 5, wherein each of the oscillating domains is provided with a sample holder that holds a sample in such a manner that the sample does not leak outside the corresponding oscillating domain.

7. The QCM sensor according to claim 6, wherein at least a pair of the oscillating domains is provided for each sample holder, and one of the oscillating domains is used as a target oscillating domain in measuring the sample.

8. The QCM sensor according to claim 7, wherein a sensing film that is combined specifically with a substance to be measured is formed on a surface of the electrode that is disposed in the target oscillating domain.

9. The QCM sensor according to claim 5, wherein each of the oscillating domains has a different resonance frequency.

10. The QCM sensor according to claim 9, wherein at least any one of area and shape of electrodes in each of the oscillating domains is different.

11. The QCM sensor according to claim 5, wherein all the oscillating domains have substantially same resonance frequency.

12. The QCM sensor according to claim 1, further comprising a substrate, wherein the pair of connecting lines is formed on the substrate.

13. The QCM sensor according to claim 1, further comprising a substrate wherein the pair of connecting lines are wired outside the substrate.

14. A QCM (quartz crystal microbalance) sensor that detects an amount of a substance adsorbed on a piezoelectric transducer based on a change in resonance frequency of the piezoelectric transducer, comprising:

a substrate; and a plurality of piezoelectric transducers, each piezoelectric transducer having a plurality of oscillating domains formed on the substrate, one of the oscillating domains being used as a reference oscillating domain and another one of the oscillating domains being used as a target oscillating domain for measurement of a sample;

a plurality of pair of electrodes including a first electrode and a second electrode, each pair of electrodes corresponding to each oscillating domain on the substrate to drive the corresponding oscillating domain;

a pair of connecting lines including a first connecting line that is commonly connected to each of the first electrodes of the piezoelectric transducers and a second connecting line that is commonly connected to each of the second electrodes of the piezoelectric transducers; and a pair of terminals including a first terminal that is connected to the first connecting line and a second terminal that is connected to the second connecting line.

15. The QCM sensor according to claim 14, wherein a sensing film that is combined specifically with a substance to be measured is formed on a surface of the electrode that is disposed in the target oscillating domain.

16. The QCM sensor according to claim 14, wherein each of the oscillating domains has a different resonance frequency.

17. The QCM sensor according to claim 16, wherein at least any one of area and shape of electrodes in each of the oscillating domains is different.

18. The QCM sensor according to claim 14, wherein all the oscillating domains have substantially same resonance frequency.

19. The QCM sensor according to claim 14, wherein the pair of connecting lines is formed on the substrate.

20. The QCM sensor according to claim 14, wherein the pair of connecting lines are wired outside the substrate of the piezoelectric transducer.

21. A QCM (quartz crystal microbalance) sensor device comprising:

a quartz crystal microbalance sensor that includes a plurality of piezoelectric transducers, each piezoelectric transducer having a pair of electrodes including a first electrode and a second electrode, each piezoelectric transducer oscillating at a predetermined resonance frequency; and a pair of terminals including a first terminal that is commonly connected to each of the first electrodes of the piezoelectric transducers and a second terminal that is commonly connected to each of the second electrodes of the piezoelectric transducers; and a resonance-frequency measuring unit that is connected to the pair of terminals of the quartz crystal microbalance sensor and that detects an amount of a substance adsorbed on a piezoelectric transducer based on a change in resonance frequency of the piezoelectric transducer, wherein the change in resonance frequency of each of the piezoelectric transducers is caused by adsorption of the substance on the piezoelectric transducer, and calculates a mass of the substance adsorbed on the piezoelectric transducer from the change in resonance frequency measured.

22. The QCM sensor device according to claim 21, wherein the resonance-frequency measuring unit includes a measuring unit that measures information of frequency dependence of combined admittance or combined impedance of the piezoelectric transducers, and a calculating unit that calculates the resonance frequency of each of the piezoelectric transducers based on information measured by the measuring unit.

23. The QCM sensor device according to claim 22, wherein
the measuring unit measures impedance or admittance of each of the piezoelectric transducers by sweeping frequencies in a predetermined frequency range that includes the resonance frequencies of the piezoelectric transducers, and
the calculating unit calculates resonance frequency of each of the piezoelectric transducers by calculating equivalent circuit constants of the combined admittance or the combined impedance based on information measured by the measuring unit.

24. The QCM sensor device according to claim 23, wherein the calculating unit calculates the equivalent circuit constants of the combined admittance or the combined impedance by a calculation based on a method of least squares that uses information of impedance or admittance of each of the piezoelectric transducers measured by the measuring unit.

25. The QCM sensor device according to claim 21, further comprising a substrate, wherein each piezoelectric transducer includes
a plurality of oscillating domains, one of the oscillating domains being used as a reference oscillating domain and another one of the oscillating domains being used as a target oscillating domain for measurement of a sample; and
a plurality of pair of electrodes, each pair of electrodes corresponding to each oscillating domain on the substrate to drive the corresponding oscillating domain, wherein
the resonance-frequency measuring unit corrects information measured in the another one of the oscillating domains using information measured in the reference oscillating domain.

26. The QCM sensor device according to claim 25, further comprising a sample holder adapted to hold the sample in each of the target oscillating domain and the reference oscillating domain in such a manner that the sample does not leak outside the target oscillating domain and the reference oscillating domain.

27. A QCM (quartz crystal microbalance) sensor device comprising:
a quartz crystal microbalance sensor that includes
a substrate;
a piezoelectric transducer, said piezoelectric transducer having a plurality of oscillating domains, one of the oscillating domains being used as a reference oscillating domain and another one of the oscillating domains being used as a target oscillating domain for measurement of a sample, and a plurality of pair of electrodes, each pair of electrodes corresponding to each oscillating domain on the substrate to drive the corresponding oscillating domain and including a first electrode and a second electrode, said piezoelectric transducer oscillating at a predetermined resonance frequency; and
a pair of terminals including a first terminal that is commonly connected to each of the first electrodes of the piezoelectric transducers and a second terminal that is commonly connected to each of the second electrodes of the piezoelectric transducer; and
a resonance-frequency measuring unit that is connected to the pair of terminals of the quartz crystal microbalance sensor and that detects an amount of a substance adsorbed on the piezoelectric transducer based on a change in resonance frequency of the piezoelectric transducer, wherein the change in resonance frequency of the piezoelectric transducer is caused by adsorption of the substance on the piezoelectric transducer, and calculates a mass of the substance adsorbed on the piezoelectric transducer from the change in resonance frequency measured, wherein
the resonance-frequency measuring unit corrects information measured in the another one of the oscillating domains using information measured in the reference oscillating domain.

* * * * *